US012630187B2

(12) United States Patent
Kume et al.

(10) Patent No.: US 12,630,187 B2
(45) Date of Patent: May 19, 2026

(54) VEHICLE CONTROL DEVICE

(71) Applicant: DENSO CORPORATION, Kariya-city (JP)

(72) Inventors: Takuya Kume, Kariya-city (JP); Kazuki Izumi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 62 days.

(21) Appl. No.: 18/661,151

(22) Filed: May 10, 2024

(65) Prior Publication Data

US 2024/0294188 A1 Sep. 5, 2024

Related U.S. Application Data

(63) Continuation of application No. PCT/JP2022/039488, filed on Oct. 24, 2022.

(30) Foreign Application Priority Data

Nov. 15, 2021 (JP) ................................. 2021-185883
May 30, 2022 (JP) ................................. 2022-087901
Aug. 1, 2022 (JP) ................................. 2022-122747

(51) Int. Cl.
*B60W 60/00* (2020.01)
*B60W 30/14* (2006.01)
(Continued)

(52) U.S. Cl.
CPC .... *B60W 60/00133* (2020.02); *B60W 30/143* (2013.01); *B60W 30/162* (2013.01);
(Continued)

(58) Field of Classification Search
CPC ......... B60W 60/00133; B60W 30/143; B60W 30/162; B60W 30/182; B60W 50/14;
(Continued)

(56) References Cited

U.S. PATENT DOCUMENTS 9,238,467 B1 * 1/2016 Hoye .................... B60W 50/14
9,956,963 B2 * 5/2018 Vijaya Kumar ...... B60W 40/08
(Continued)

FOREIGN PATENT DOCUMENTS

JP 2005324661 A 11/2005
JP 2008120271 A 5/2008
(Continued)

*Primary Examiner* — Joseph J Dallo
(74) *Attorney, Agent, or Firm* — Harness, Dickey & Pierce, P.L.C.

(57) ABSTRACT

A control unit performs switching control, in automatic driving of a vehicle, between a first automatic driving state of an automatic drivingX level 2 or lower with manual driving or surrounding monitoring obligation, and a second automatic driving state of an automatic driving level 4 or higher with no surrounding monitoring obligation and allowing sleep, depending on a road on which the vehicle travels. When the control unit determines that a driver is in an asleep state based on a detection result of a detection unit in the second automatic driving state, the control unit performs acceleration control to adjust second vehicle speed in the second automatic driving state to be higher than first vehicle speed in the first automatic driving state, equal to the first vehicle speed, or lower than the first vehicle speed and higher than the second vehicle speed in a current state.

26 Claims, 28 Drawing Sheets

(51) Int. Cl.
    *B60W 30/16*        (2020.01)
    *B60W 30/182*     (2020.01)
    *B60W 50/14*      (2020.01)

(52) U.S. Cl.
    CPC .......... *B60W 30/182* (2013.01); *B60W 50/14*
        (2013.01); *B60W 2420/403* (2013.01); *B60W*
        *2540/229* (2020.02); *B60W 2554/80* (2020.02);
        *B60W 2720/106* (2013.01)

(58) Field of Classification Search
    CPC ..... B60W 2420/403; B60W 2540/229; B60W
        2554/80; B60W 2720/106; B60W
        2540/00; B60W 2540/22; B60W 2552/05;
        B60W 60/0055; B60W 60/0051; B60W
        50/08; G08G 1/16
    See application file for complete search history.

(56)             References Cited

U.S. PATENT DOCUMENTS

| | | | |
|---|---|---|---|
| 2017/0248949 A1* | 8/2017 | Moran | ................... G08G 1/165 |
| 2018/0046185 A1 | 2/2018 | Sato et al. | |
| 2018/0203451 A1* | 7/2018 | Cronin | ............... B60W 60/0011 |
| 2019/0039618 A1 | 2/2019 | Mori | |
| 2021/0024085 A1 | 1/2021 | Kitagawa | |
| 2021/0362594 A1* | 11/2021 | Mohana | ............... G08B 21/182 |
| 2022/0194433 A1 | 6/2022 | Nagata et al. | |
| 2023/0037467 A1 | 2/2023 | Yamamoto et al. | |
| 2023/0054024 A1 | 2/2023 | Oba et al. | |
| 2024/0361132 A1* | 10/2024 | Kume | .................... G01C 21/34 |

FOREIGN PATENT DOCUMENTS

| | | | | |
|---|---|---|---|---|
| JP | 2017107502 A | 6/2017 | | |
| JP | 2018027726 A | 2/2018 | | |
| JP | 2019185225 A | 10/2019 | | |
| JP | 2021030768 A | 3/2021 | | |
| JP | 2021130451 A | 9/2021 | | |
| WO | WO-2017154396 A1 | 9/2017 | | |
| WO | WO-2021145131 A1 | 7/2021 | | |
| WO | WO-2021209448 A1 * | 10/2021 | ......... | G01C 21/3415 |

* cited by examiner

Figure 24:
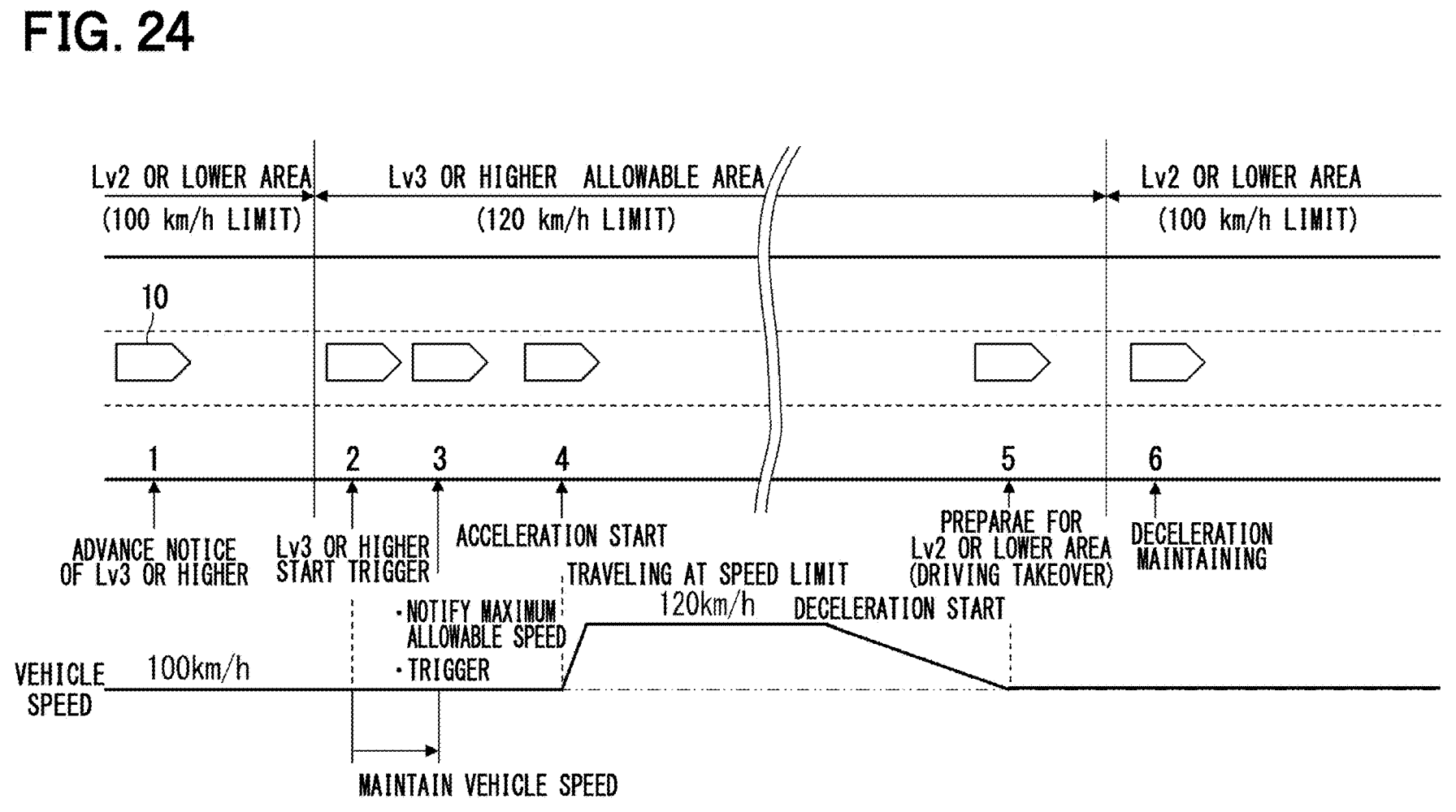

Lv2 OR LOWER AREA
(100 km/h LIMIT)

Lv3 OR HIGHER ALLOWABLE AREA
(120 km/h LIMIT)

Lv2 OR LOWER AREA
(100 km/h LIMIT)

10

1 — ADVANCE NOTICE OF Lv3 OR HIGHER

2 — Lv3 OR HIGHER START TRIGGER

3 — ACCELERATION START · NOTIFY MAXIMUM ALLOWABLE SPEED · TRIGGER

4 — TRAVELING AT SPEED LIMIT 120km/h

5 — PREPARAE FOR Lv2 OR LOWER AREA (DRIVING TAKEOVER) DECELERATION START

6 — DECELERATION MAINTAINING

VEHICLE SPEED 100km/h

MAINTAIN VEHICLE SPEED

FIG. 26

VEHICLE CONTROL DEVICE

CROSS REFERENCE TO RELATED APPLICATION

The present application is a continuation application of International Patent Application No. PCT/JP2022/039488 filed on Oct. 24, 2022, which designated the U.S. and claims the benefit of priority from Japanese Patent Applications No. 2021-185883 filed on Nov. 15, 2021, No. 2022-087901 filed on May 30, 2022, and No. 2022-122747 filed on Aug. 1, 2022. The entire disclosures of all of the above applications are incorporated herein by reference.

TECHNICAL FIELD

The present disclosure relates to a vehicle control device.

BACKGROUND

The vehicle control device to automatically drive a vehicle has been known.

SUMMARY

According to an aspect of the present disclosure, a vehicle control device comprises: a control unit configured to perform switching control, in automatic driving of a vehicle, between a first automatic driving state of an automatic driving level 2 or lower with manual driving or surrounding monitoring obligation, and a second automatic driving state of an automatic driving level 4 or higher with no surrounding monitoring obligation and allowing sleep, depending on a road on which the vehicle travels.

BRIEF DESCRIPTION OF THE DRAWINGS

The above and other objects, features and advantages of the present disclosure will become more apparent from the following detailed description made with reference to the accompanying drawings. In the drawings:

FIG. 7 is a schematic illustration of the contents of automatic drive control in the third embodiment;

FIG. 12 is a schematic illustration of the contents of automatic drive control in the fifth embodiment;

FIG. 18 is a schematic illustration of the contents of automatic drive control in the tenth embodiment;

FIG. 19 is a schematic illustration of the contents of automatic drive control in the eleventh embodiment;

FIG. 22 is a schematic illustration of the contents of automatic drive control in the fourteenth embodiment;

FIG. 24 is a schematic illustration of the contents of automatic drive control in the sixteenth embodiment;

FIG. 26 is a schematic illustration of the contents of automatic drive control in a modification of the seventeenth embodiment;

DETAILED DESCRIPTION

Figure 1:
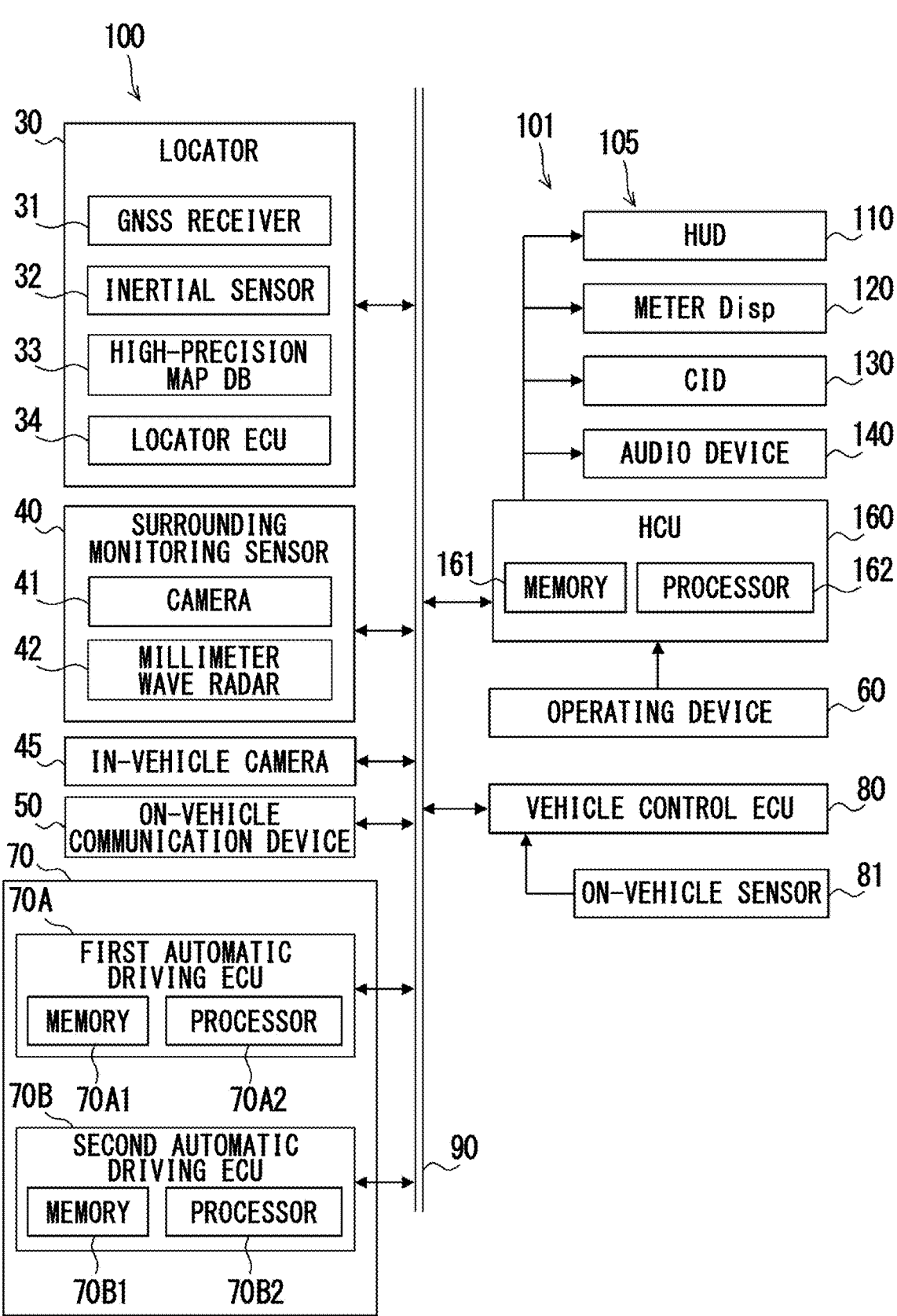
FIG. 1 is a block diagram showing an overall configuration of a vehicle control device.

Hereinafter, examples of the present disclosure will be described. According to an example of the present disclosure, a vehicle control device (driving takeover control device) provides a switching unit to reduce a driving load (for example, speed) before driving takeover during shift from an automatic driving allowable area to a manual driving area. As a result, anxiety of a driver is reduced in driving takeover from automatic driving to manual driving.

The automatic driving is supposed to be classified into automatic driving levels 3 to 5 without surrounding monitoring obligation. Furthermore, sleep (nap) of a driver is supposed to be permitted at the automatic driving levels 4 and 5.

Since the automatic driving level 4 or higher involves no surrounding monitoring obligation, when the set vehicle speed is changed to a relatively high side, the driver may feel anxiety even during the automatic driving. On the other hand, when the driver is sleeping during the automatic driving, the driver will not feel anxiety even when the vehicle speed setting is changed to a relatively high side. The same applies to a passenger.

According to the first disclosure, a vehicle control device comprises:

a control unit configured to perform switching control, in automatic driving of a vehicle, between a first automatic driving state of an automatic driving level 2 or lower with manual driving or surrounding monitoring obligation, and a second automatic driving state of an automatic driving level 4 or higher with no surrounding monitoring obligation and allowing sleep, depending on a road on which the vehicle travels; and a detection unit configured to detect a status of at least one occupant of the vehicle.

When the control unit determines that a driver among the at least one occupant is in an asleep state based on a detection result of the detection unit in the second automatic driving state, the control unit is configured to perform acceleration control to adjust second vehicle speed in the second automatic driving state, to be higher than first vehicle speed in the first automatic driving state, to be equal to the first vehicle speed, or to be lower than the first vehicle speed and higher than the second vehicle speed in a current state.

According to the first disclosure, in the second automatic driving state, when a driver is determined to be asleep, acceleration control is executed, and thus vehicle speed setting can be changed to a higher side within speed limit without causing anxiety to the driver.

During automatic driving, vehicle speed is desirably appropriately set depending on an awake state of an occupant, surrounding conditions during traveling, or an execution status of a second task.

According to the second disclosure, a vehicle control device comprises:

a control unit configured to perform switching control, in automatic driving of a vehicle, between a first automatic driving state of an automatic driving level 2 or lower with manual driving or surrounding monitoring obligation, and a second automatic driving state of an automatic driving level 4 or higher with no surrounding monitoring obligation and allowing sleep, depending on a road on which the vehicle travels;

a detection unit configured to detect a status of at least one occupant of the vehicle; and an autonomous sensor configured to detect surrounding environment of the vehicle.

When the control unit determines that the occupant is in an awake state based on a detection result of the detection unit in the second automatic driving state, the control unit is configured to change vehicle speed in the second automatic driving state depending on the surrounding environment acquired by the autonomous sensor or an execution status of a second task of the occupant acquired by the detection unit, the second task being allowed in the second automatic driving state.

According to the second disclosure, vehicle speed in the second automatic driving state is changed depending on an awake state of an occupant, surrounding environment during traveling, or an execution status of a second task of the occupant, thereby the occupant can view surrounding scenery in a relaxed and anxiety-free manner.

According to the third disclosure, a vehicle control device comprises:

a control unit configured to perform switching control, in automatic driving of a vehicle, between a first automatic driving state of an automatic driving level 2 or lower with manual driving or surrounding monitoring obligation, a second automatic driving state of an automatic driving level 4 or higher with no surrounding monitoring obligation and allowing sleep, and a third automatic driving state of an automatic driving level 3 with no surrounding monitoring obligation, depending on a road on which the vehicle travels.

The control unit is configured to adjust an acceleration/deceleration range of set vehicle speed in the second automatic driving state to be wider than the acceleration/deceleration range of the set vehicle speed in the third automatic driving state.

According to the third disclosure, in the second automatic driving state compared to in the third automatic driving state, an acceleration/deceleration range of a set vehicle speed is widened, and thus the set speed can be changed flexibly, allowing smooth traveling.

According to the fourth disclosure, a vehicle control device comprises:

a control unit configured to perform switching control, in automatic driving of a vehicle, between a first automatic driving state of an automatic driving level 2 or lower with manual driving or surrounding monitoring obligation, a second automatic driving state of an automatic driving level 4 or higher with no surrounding monitoring obligation and allowing sleep, and a third automatic driving state of an automatic driving level 3 with no surrounding monitoring obligation, depending on a road on which the vehicle travels.

The control unit is configured to set an inter-vehicle distance between a subject vehicle and an other vehicle to be different between the second automatic driving state and the third automatic driving state, even when set vehicle speed is the same between the second automatic driving state and the third automatic driving state.

According to the fourth disclosure, in the second automatic driving state compared to in the third automatic driving state, an inter-vehicle distance can be changed flexibly, allowing smooth traveling.

According to the fifth disclosure, a vehicle control device comprises:

a control unit configured to perform switching control, in automatic driving of a vehicle, between a low automatic driving state of an automatic driving level 2 or lower with manual driving or surrounding monitoring obligation, and a high automatic driving state of an automatic driving level 3 or higher with no surrounding monitoring obligation, depending on a road on which the vehicle travels.

The control unit increases vehicle speed to reach a second maximum speed, which is set for a road for traveling at the high automatic driving state, after shift from the low automatic driving state to the high automatic driving state. The control unit is configured to reduce the vehicle speed to be equal to or lower than a first maximum speed, which is set for a road for traveling at the low automatic driving state, before shift from the high automatic driving state to the low automatic driving state.

According to the fifth disclosure, since vehicle speed is increased in accordance with speed limit of a road on which a vehicle travels in the high automatic driving state, and thus a vehicle can travel at a faster speed. At shift from the high automatic driving state to the low automatic driving state again, since the vehicle speed is lowered in advance to the speed limit of the road corresponding to the low automatic driving state, smooth shift is achieved.

According to the sixth disclosure, a vehicle control device comprises:

a control unit configured to perform switching control, in automatic driving of a vehicle, between a low automatic driving state of an automatic driving level 2 or lower with manual driving or surrounding monitoring obligation, and a high automatic driving state of an automatic driving level 3 or higher with no surrounding monitoring obligation, depending on a road on which the vehicle travels; and a notification unit configured to notify information on the automatic driving.

After shift from the low automatic driving state to the high automatic driving state, the control unit is configured to continue traveling at a vehicle speed in the low automatic driving state. When the vehicle speed as continued is lower than a maximum speed, which is set for a road for traveling in the high automatic driving state, the control unit is configured to cause the notification unit to notify a driver of the maximum speed. When the driver gives permission to accelerate, the control unit is configured to increase the vehicle speed to reach the maximum speed.

According to the sixth disclosure, the maximum speed in the allowable area of the high automatic driving state is notified to the driver, and acceleration is performed when the driver gives permission to accelerate, and thus speed change (acceleration) is performed after the driver recognizes such acceleration, allowing traveling at a faster speed while the driver feels no anxiety.

According to the seventh disclosure, a vehicle control device comprises:

a control unit configured to perform switching control, in automatic driving of a vehicle, between a low automatic driving state of an automatic driving level 2 or lower with manual driving or surrounding monitoring obligation, and a high automatic driving state of an automatic driving level 3 or higher with no surrounding monitoring obligation, depending on a road on which the vehicle travels.

When there is an overspeed-allowable lane, which allows overspeed in a case of the low automatic driving state, in a high automatic area that allows the high automatic driving state, the control unit is configured to attempt lane change to the overspeed-allowable lane.

According to the seventh disclosure, when lane change is allowable, vehicle speed can be increased, allowing traveling at a faster speed.

According to the eighth disclosure, a vehicle control device comprises:

a control unit configured to perform switching control, in automatic driving of a vehicle, between a low automatic driving state of an automatic driving level 2 or lower with manual driving or surrounding monitoring obligation, and a high automatic driving state of an automatic driving level 3 or higher with no surrounding monitoring obligation, depending on a road on which the vehicle travels; and a notification unit configured to notify information on the automatic driving.

When speed regulation is executed due to traveling environment in a high automatic area, which allows the high automatic driving state, the control unit is configured to cause the notification unit to notify a driver of regulated speed. When the driver gives permission to decelerate, the control unit is configured to perform deceleration to the regulated speed.

According to the eighth disclosure, when there is speed regulation depending on traveling environment, the regulated speed is notified to a driver by a notification unit, and when the driver gives permission to decelerate, the speed is reduced to reach the regulated speed, and thus it is possible to suppress occurrence of sudden approach to a following vehicle due to deceleration.

Hereinafter, several embodiments of the disclosure are described with reference to drawings. In each embodiment, a portion corresponding to a matter described in the preceding embodiment may be designated by the same reference numeral and duplicated description may be omitted. When only a portion of a configuration is described in each embodiment, other embodiments previously described can be applied to other portions of the configuration. Not only a combination of combinable portions specified in the embodiments but also a partial combination of the embodiments is possible while being not specified as long as there is no particular problem with the combination.

First Embodiment

A vehicle control device 100 of a first embodiment is now described with reference to FIGS. 1 to 4. The vehicle control device 100, which executes control on automatic driving of a vehicle 10, performs switching control between a first automatic driving state of an automatic driving level 2 or lower with manual driving or surrounding monitoring obligation, and a second automatic driving state of an automatic driving level 4 or higher with no surrounding monitoring obligation (automatic driving level 3 or higher) and allowing sleep, depending on a road on which the vehicle 10 travels. The vehicle control device 100 is formed with a locator 30, a surrounding monitoring sensor 40, an in-vehicle camera 45, an on-vehicle communication device 50, an operating device 60, a control unit 70, a vehicle control ECU 80, and the like, which are connected via a communication bus 90.

The vehicle control device 100 has a vehicular notification device 101. The vehicular notification device 101 uses a plurality of display devices (various displays 110 to 130) as described later to notify (show), by an image etc., a driver of vehicle traveling information, such as, for example, vehicle speed, engine speed, a transmission shift position, and even navigation information by a navigation system (herein, locator 30). Alternatively, the vehicular notification device 101 uses an audio device 140 to notify the driver of the vehicle traveling information by audio. Furthermore, the vehicular notification device 101 notifies the driver of information on automatic driving when the above automatic driving is performed. The vehicular notification device 101 includes a notification unit 105, Human Machine Interface Control Unit (HCU) 160, and the like.

The vehicular notification device 101 is connected to the locator 30, the surrounding monitoring sensor 40, the in-vehicle camera 45, the on-vehicle communication device 50, the control unit 70, and the vehicle control ECU 80 via the communication bus 90 and the like. The vehicular notification device 101 is connected to the operating device 60.

A configuration of the vehicular notification device 101 is now described.

The locator 30 forms a navigation system and generates own-vehicle position information (location information) etc., by complex positioning with multiple pieces of acquired information being combined. The locator 30 includes a Global Navigation Satellite System (GNSS) receiver 31, an inertial sensor 32, a high-precision map database ("map DB") 33, and a locator ECU 34.

The GNSS receiver 31 receives positioning signals from multiple positioning satellites.

The inertial sensor 32 detects inertial forces acting on the vehicle 10. The inertial sensor 32 includes, for example, a gyro sensor and an acceleration sensor.

The map DB 33 is a nonvolatile memory that stores map data such as link data, node data, road geometry, and structures. The map data may be a three-dimensional map including a point cloud of feature points of the road geometry and the structures. The three-dimensional map may be generated by Road Experience Management (REM) based on captured images. The map data may include traffic regulation information, road construction information, weather information, signal information, and the like. The map data stored in the map DB 33 is updated periodically or at any time based on the latest information received by the on-vehicle communication device 50 described later.

The locator ECU 34 mainly includes a microcomputer including a processor, a memory, an input/output interface, buses connecting such components, and the like. The locator ECU 34 sequentially measures a position of the vehicle 10 (hereinafter, referred to as subject vehicle position) by combining a positioning signal received by the GNSS receiver 31, a measurement result of the inertial sensor 32, and map data of the map DB 33.

In a possible configuration, the own-vehicle position is represented by latitude and longitude coordinates, for example. In another possible configuration, a travel distance, which is acquired from signals sequentially output from an on-vehicle sensor 81 (vehicle speed sensor, etc.) mounted on the vehicle 10, is used for positioning of the own-vehicle position. In a still further possible configuration, when using a three-dimensional map including a point group of feature points of road shapes and structures as map data, the locator ECU 34 uses the three-dimensional map and detection results of the surrounding monitoring sensor 40 without using the GNSS receiver 31 to specify the own-vehicle position.

The surrounding monitoring sensor 40 is an autonomous sensor that monitors (detects) the surrounding environment of the vehicle 10. The surrounding monitoring sensor 40 can detect, from a detection range around the vehicle 10, for example, moving objects such as a pedestrian, a cyclist, a non-human animal, and other vehicles (front vehicle, following vehicle), fallen objects on the road, a guardrail, a curb, a road sign, road surface indications such as a road type (general road, expressway, autobahn, etc.), a lane, lane width, a lane marking, and a median strip, a stationary object such as a roadside structure, a scenic spot, a tunnel, weather information, and the like. The surrounding monitoring sensor 40 may detect the scenic spot using the map DB 33 of the locator 30.

The surrounding monitoring sensor 40 provides detection information obtained by detecting objects around the vehicle 10 to the control unit 70 through the communication bus 90. The surrounding monitoring sensor 40 includes, for example, a camera 41 and a millimeter wave radar 42 as detection components for object detection.

The camera 41 has a front camera and a rear camera. The front camera outputs, as detection information, imaging data obtained by photographing the front range (front area) of the vehicle 10 and/or an analysis result of the imaging data. Similarly, the rear camera outputs, as detection information, imaging data obtained by photographing the rear range (rear area) of the vehicle 10 and an analysis result of the imaging data.

The millimeter wave radar 42 includes, for example, a plurality of millimeter wave radars 42 that are disposed spaced apart from each other on each of the front and rear bumpers of the vehicle 10. The millimeter wave radar 42 irradiates a millimeter wave or a quasi-millimeter wave toward the front range, front side range, rear range, rear side range, etc., of the vehicle 10. The millimeter wave radar 42 generates detection information through a process of receiving reflected waves reflected by a moving object, a stationary object, and the like. The surrounding monitoring sensor 40 may include another detection component such as Light Detection and Ranging/Laser Imaging Detection and Ranging (LiDAR) that detects a point group of feature points of a terrestrial object, or a sonar that receives a reflected wave of an ultrasonic wave.

The in-vehicle camera 45 is a detection unit that detects statuses of occupants (driver and passengers). The occupant's status includes an awake or asleep state, a sight line, a seating position, a posture (behavior), and the like of the occupant.

The in-vehicle camera 45, including, for example, a CCD camera, a CMOS camera, an infrared camera, is provided on a front side of the ceiling of the vehicle 10. The in-vehicle camera 45 acquires images of a face, an upper body, or the like of the occupant, and provides the acquired image data to the control unit 70 (second automatic driving ECU 70B) through the communication bus 90.

The on-vehicle communication device 50 is a communication module mounted on the vehicle 10. The on-vehicle communication device 50 has at least the function of Vehicle to cellular Network (V2N) communication in accordance with the communication standards of Long Term Evolution (LTE), 5G, or the like, and transmits and receives a radio wave to and from base stations etc. around the vehicle 10. The on-vehicle communication device 50 may further have functions such as Vehicle to roadside Infrastructure (hereinafter referred to as "V2I") communication and Vehicle-to-Vehicle (hereinafter "V2V") communication. The on-vehicle communication device 50 enables cooperation between the cloud and the on-vehicle system (Cloud to Car) through V2N communication. The vehicle 10 becomes a connected car connectable to the Internet by mounting the on-vehicle communication device 50.

The on-vehicle communication device 50 uses, for example, Vehicle information and communication System (VICS) (registered trademark) to acquire road traffic information such as traffic congestion conditions and traffic regulations from FM multiplex broadcasts or beacons installed on roads.

The on-vehicle communication device 50 communicates with a plurality of front and following vehicles via a predetermined center base station or directly between vehicles by using, for example, Data Communication Module (DCM) or vehicle-to-vehicle communication. The on-vehicle communication device 50 thus acquires information such as vehicle speeds, positions, and execution statuses of the automatic driving of other vehicles traveling in front of and behind the vehicle 10.

The on-vehicle communication device 50 provides information on other vehicles (surrounding information) based on VICS and DCM to the control unit 70, HCU 160, and the like.

The operating device 60 is an input unit that receives operations from a user such as a driver. The operating device 60 receives, for example, user operations involved in start and stop of each level of the automatic driving function. The operating device 60 includes, for example, a steering switch provided on a spoke part of a steering wheel, an operation lever provided on a steering column part, a voice input device to recognize driver's utterances, and an icon (switch) for touch operations on a center information display 130. The input signal received by the operating device 60 is sent to the control unit 70 via the HCU 160. The items received by the operating device 60 include whether a second task described later is requested.

The control unit 70 has a first automatic driving ECU 70A and a second automatic driving ECU 70B. The respective first and second automatic driving ECUs 70A and 70B mainly include computers including memories 70A1 and 70B1, processors 70A2 and 70B2, input/output interfaces, buses connecting these components, and the like. The first and second automatic driving ECUs 70A and 70B can execute automatic driving control to partially or substantially completely control traveling of the vehicle 10.

The first automatic driving ECU 70A has a partial automatic driving function (first automatic driving state) that partially takes over driver's driving operation. As an example, at the automatic driving level as defined by the Society of Automotive Engineers, the first automatic driving ECU 70A enables manual or partially automatic traveling control (driving assistance) of level 2 or lower with a surrounding monitoring obligation.

In the first automatic driving ECU 70A, a driving assistance program stored in the memory 70A1 causes the processor 70A2 to execute a plurality of instructions, and thus a plurality of functional units are built to achieve the above driving assistance.

The first automatic driving ECU 70A recognizes the traveling environment around the vehicle 10 based on the detection information acquired from the surrounding monitoring sensor 40. As an example, the first automatic driving ECU 70A generates, as analyzed detection information, information (lane information) indicating relative positions and shapes of the left and right marking lines or road ends of a lane in which the vehicle 10 is traveling (hereinafter, referred to as current lane). In addition, the first automatic driving ECU 70A generates, as analyzed detection information, information (front vehicle information) indicating whether there is a front vehicle (another vehicle) ahead of the vehicle 10 in the current lane, and when there is a front vehicle, the position and speed of the front vehicle.

The first automatic driving ECU 70A executes Adaptive Cruise Control (ACC) control that achieves constant-speed traveling at a target speed of the vehicle 10 or preceding-vehicle following traveling based on the front vehicle information. The first automatic driving ECU 70A executes Lane Tracing Assist (LCA) control to maintain in-lane traveling of the vehicle 10 based on the lane information. Specifically, the first automatic driving ECU 70A generates acceleration/deceleration or steering angle control commands and sequentially provides the commands to the vehicle control ECU 80 described later. The ACC control is an example of longitudinal control, and the LTA control is an example of lateral control.

The first automatic driving ECU 70A achieves automatic driving of level 2 or lower by executing both the ACC control and the LTA control. The first automatic driving ECU 70A may be capable of achieving automatic driving of level 1 by executing either the ACC control or the LTA control.

On the other hand, the second automatic driving ECU 70B has an automatic driving function (second automatic driving state) that can take over driving operation of a driver. The second automatic driving ECU 70B enables automatic driving control of level 3 or higher (automatic driving) in the above automatic driving levels. Specifically, the second automatic driving ECU 70B enables automatic driving that permits the driver to suspend the surrounding monitoring (without surrounding monitoring obligation). In other words, the second automatic driving ECU 70B enables automatic driving permitting the second task.

The second task is an action other than driving, which is permitted to the driver, and a predefined specific action. Examples of the second task include operating a smartphone at the automatic driving level 3 or higher, watching movies on a center information display 130, reading books, talking with another occupant, and sleep (napping) at the automatic driving level 4 or higher. In other words, at the automatic driving level 4 or higher, the second automatic driving ECU 70B enables (allows) a driver to sleep (nap) even while traveling.

In the second automatic driving ECU 70B, the automatic driving program stored in a memory 70B1 causes the processor 70B2 to execute a plurality of instructions so as to build a plurality of functional units that achieve the above automatic driving.

The second automatic driving ECU 70B recognizes traveling environment around the vehicle 10 based on a subject vehicle position and map data acquired from the locator ECU 34, detection information (surrounding environment) acquired from the surrounding monitoring sensor 40, communication information acquired from the on-vehicle communication device 50, and the like. For example, the second automatic driving ECU 70B recognizes a position of the current lane of the vehicle 10, a shape of the current lane, relative positions and relative speeds of moving objects (other vehicles) around the vehicle 10, a traffic jam status, and the like.

In addition, the second automatic driving ECU 70B distinguishes between a manual driving area (MD area) and an automatic driving area (AD area) in a traveling region of the vehicle 10, and distinguishes between a non-ST section and an ST section in the AD area, and sequentially provides results of such recognition to the HCU 160 described later.

In the MD area, the automatic driving is prohibited. In other words, in the MD area, longitudinal control and lateral control of the vehicle 10, and surrounding monitoring are all defined to be performed by a driver. For example, in the MD area, a traveling road is a public road.

In the AD area, automatic driving is permitted. In other words, in the AD area, the vehicle 10 can substitutionally perform longitudinal direction (front/rear direction) control, lateral direction (width direction) control, and/or surrounding monitoring. For example, in the AD area, the traveling road is an expressway or a freeway.

The AD area is divided into two sections, i.e., the non-ST section allowing automatic driving of level 2 or lower, and the ST section allowing automatic driving of level 3 or higher. In this embodiment, the non-ST section, permitting the automatic driving of level 1, is assumed to be equivalent to the non-ST section permitting the automatic driving of level 2.

The ST section is assumed as, for example, a traveling section with traffic congestion (congestion section). Alternatively, the ST section is assumed as, for example, a traveling section with a high-precision map being prepared. The HCU 160 described later determines a section as the ST section when traveling speed of the vehicle 10 remains within a speed range of the determination speed or lower for a predetermined period of time in that section. Alternatively, the HCU 160 may determine whether a section is the ST section or not using an own-vehicle position and traffic congestion information acquired from the on-vehicle communication device 50 using VICS or the like. Furthermore, the HCU 160 may determine whether a section is the ST section or not using not only the traveling speed of the vehicle 10 (congestion traveling section condition), but also conditions including whether the traveling road has two or more lanes, whether there are other vehicles around the vehicle 10 (in the same and adjacent lanes), whether there is a median strip on the traveling road, and whether high-precision map data are provided.

The second automatic driving ECU 70B may determine, as the ST section, not only the congested section, but also a section that satisfies a specific condition, other than traffic congestion, on surrounding environment of the vehicle 10, i.e., a section that allows constant speed traveling without traffic congestion on an expressway, following traveling, Lane Keeping Assisting (LTA), and the like.

The second automatic driving ECU 70B detects whether occupants (driver and passengers) are awake or asleep from image data acquired by the in-vehicle camera 45. The second automatic driving ECU 70B determines from a face image of each occupant that the occupant is sleeping, for example, when the eyelids of the occupant are continuously closed for a predetermined period of time or longer. The second automatic driving ECU 70B recognizes a sight line, a seating position, a posture (whether the second task is executed), etc. of each occupant from the image data acquired by the in-vehicle camera 45. The second automatic driving ECU 70B recognizes a situation of the occupant as described above and performs control in the second automatic driving state at the automatic driving level 4 or higher, as described in detail later.

The automatic driving system including the first automatic driving ECU 70A and the second automatic driving ECU 70B allows the vehicle 10 to at least perform automatic driving of level 2 or lower and of level 3 or higher. The level 4 refers to complete automatic driving under a specific condition (for example, limited region), and the level 5 refers to complete automatic driving where automatic driving is constantly performed.

The vehicle control ECU 80 is an electronic control unit that performs acceleration/deceleration control and steering control of the vehicle 10. The vehicle control ECU 80 includes a power unit control ECU and a brake ECU for acceleration/deceleration control, a steering ECU for steering control, and the like. The vehicle control ECU 80 acquires a detection signal output from each of sensors mounted on the vehicle 10, such as a vehicle speed sensor and a steering angle sensor, and outputs a control signal to each of traveling control devices such as an electronic control throttle, a brake actuator, and an electric power steering (EPS) motor. The vehicle control ECU 80 acquires a control instruction for the vehicle 10 from the first automatic driving ECU 70A or the second automatic driving ECU 70B, and thus controls each driving control device to achieve automatic driving according to that control instruction.

The vehicle control ECU 80 is connected to the on-vehicle sensor 81 that detects information on driving operations of operating components by a driver. The on-vehicle sensor 81 includes, for example, a pedal sensor that detects the amount of depression of an accelerator pedal, a steering sensor that detects the amount of steering of the steering wheel, and the like. In addition, the on-vehicle sensor 81 includes a vehicle speed sensor to detect traveling speed of the vehicle 10, a rotation sensor that detects operation rotation speed of a traveling drive (engine, traveling motor, etc.), a shift sensor to detect a shift position of a transmission, and the like. The vehicle control ECU 80 sequentially provides such detected driving operation information, vehicle operation information, etc. to the HCU 160.

A configuration of the vehicular notification device 101 is now described. The vehicular notification device 101 includes a notification unit 105, Human Machine Interface Control Unit (HCU) 160, and the like.

The notification unit 105 notifies occupants (mainly driver) of information on automatic driving, and includes a plurality of display devices and the audio device 140. The display devices include a head-up display ("HUD") 110, a meter display 120, a center information display ("CID") 130, and the like. The display devices may further include displays, i.e., EML (left display) and EMR (right display), of an electronic mirror system. The HUD 110, the meter display 120, and the CID 130 are each a display unit that present image content such as a still image or a moving image to the driver as visual information. For example, images of a traveling road (traveling lane), the vehicle 10, and other vehicles are used as the image content. Other vehicles include a front vehicle that travels beside and in front of the vehicle 10, a following vehicle that travels behind the vehicle 10, and the like.

The HUD 110 projects light of the image formed in front of the driver onto a projection area defined on a front windshield or the like of the vehicle 10 based on a control signal and video data acquired from the HCU 160. The image light reflected toward the vehicle interior by the front windshield is perceived by the driver seated in a driver's seat. In this way, the HUD 110 displays a virtual image in a space in front of the projection area. The driver visually recognizes the virtual image within an angle of views, which is displayed by the HUD 110, over the foreground of the vehicle 10.

The meter display 120 and the CID 130 each mainly include, for example, a liquid crystal display or an organic light emitting diode (OLED) display. The meter display 120 and the CID 130 each display various images on a display screen based on a control signal and video data acquired from the HCU 160. The meter display 120 is, for example, a main display unit provided in front of a driver's seat. The CID 130 is a sub display unit provided in the central region in the vehicle width direction in front of the driver. For example, the CID 130 is provided above a center cluster in an instrument panel. The CID 130 has a touch panel function, and detects, for example, touch operation on a display screen and swipe operation by a driver or the like.

In this embodiment, the configuration is described with an exemplary case where the meter display 120 (main display unit) is used as the display unit (unit for notifying a driver).

The audio device 140 has a plurality of speakers provided in a vehicle interior. The audio device 140 presents a notification sound, a voice message, or the like to the driver as auditory information based on the control signal acquired from the HCU 160 and voice data. In other words, the audio device 140 is an information presentation device that can present information in a mode different from visual information.

The HCU 160 controls notifications by the meter display 120 and the audio device 140 based on the information acquired by the above-described locator 30, surrounding monitoring sensor 40, in-vehicle camera 45, on-vehicle communication device 50, first automatic driving ECU 70A, second automatic driving ECU 70B, vehicle control ECU 80, and the like, as described in detail later. The HCU 160 mainly includes computers including the memory 161, the processor 162, the input/output interfaces, buses connecting these components, and the like.

The memory 161 is at least one of non-transitory tangible storage media such as, for example, a semiconductor memory, a magnetic medium, and an optical medium, which non-transitorily stores computer-readable programs, data, and the like. The memory 161 stores various programs executed by the processor 162, such as a presentation control program described later.

The processor 162 is hardware for arithmetic processing. The processor 162 includes, as a core, at least one of processors such as, for example, central processing unit (CPU), graphics processing unit (GPU), and reduced Instruction set computer (RISC)-CPU.

The processor 162 executes a plurality of instructions contained in the presentation control program stored in the memory 161. As a result, the HCU 160 builds a plurality of functional units for controlling presentation to the driver. As described above, in the HCU 160, the presentation control program stored in the memory 161 causes the processor 162 to execute a plurality of instructions, thereby a plurality of functional units are built.

The HCU 160 acquires recognition results of traveling environment from the first automatic driving ECU 70A or the second automatic driving ECU 70B. The HCU 160 recognizes a surrounding state of the vehicle 10 based on the acquired recognition result. Specifically, the HCU 160 recognizes approach to the AD area, entry into the AD area, approach to the ST section (congestion section, high speed section, etc.), entry into the ST section, and the like. The HCU 160 may recognize the surrounding state based on information directly acquired from the locator ECU 34, the surrounding monitoring sensor 40, etc. instead of the recognition results acquired from the first automatic driving ECU 70A or the second automatic driving ECU 70B.

The HCU 160 determines the automatic driving to be unallowable when the vehicle 10 is traveling in the MD area. On the other hand, the HCU 160 determines the automatic driving of level 2 or higher to be allowable when the vehicle is traveling in the AD area. Furthermore, the HCU 160 determines that the automatic driving of level 2 or lower is allowable when the vehicle is traveling in a non-ST section in the AD area, and determines that the automatic driving of level 3 or higher is allowable when the vehicle is traveling in the ST section.

The HCU 160 determines the automatic driving level to be actually executed based on surrounding environment of the vehicle 10, states of occupants (driver, passengers), a currently allowed automatic driving level, input information to the operating device 60, etc. In other words, the HCU 160 controls presentation of contents on automatic driving when start instruction of the currently allowed automatic driving level is acquired as input information. Specifically, the HCU 160 selects contents to be presented on each display device (displays 110, 120, and 130) based on the various types of information.

The HCU 160 generates control signals and video data to be provided to the respective display devices, and generates control signals and audio data to be provided to the audio device 140. The HCU 160 outputs the generated control signals and various data to the respective display devices and the audio device 140, thereby notifies each display device and the audio device 140 of information.

Figure 2:
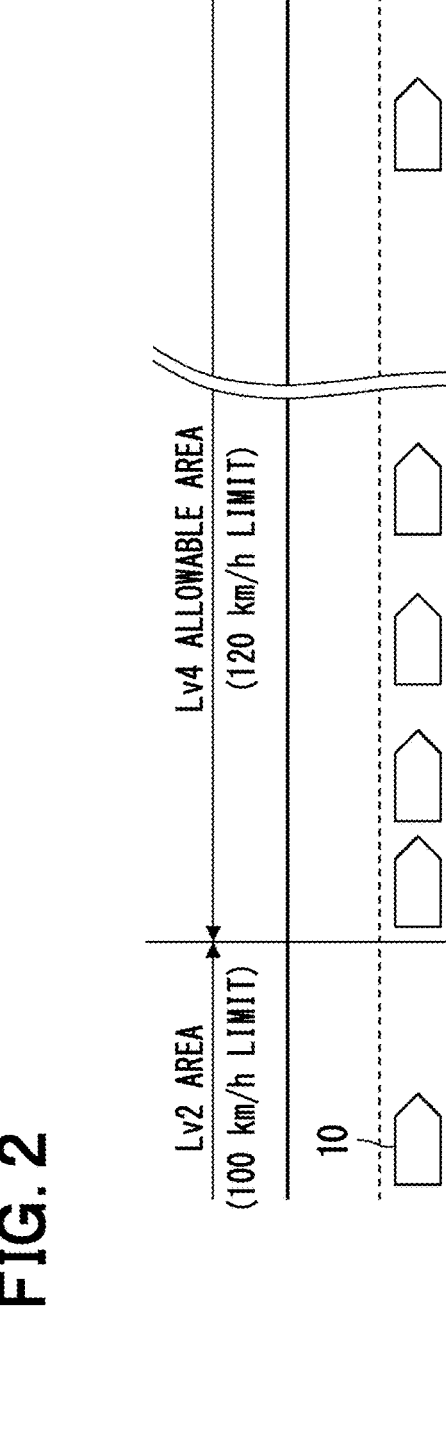
FIG. 2 is a schematic illustration of the contents of automatic drive control in a first embodiment.
Figure 3:
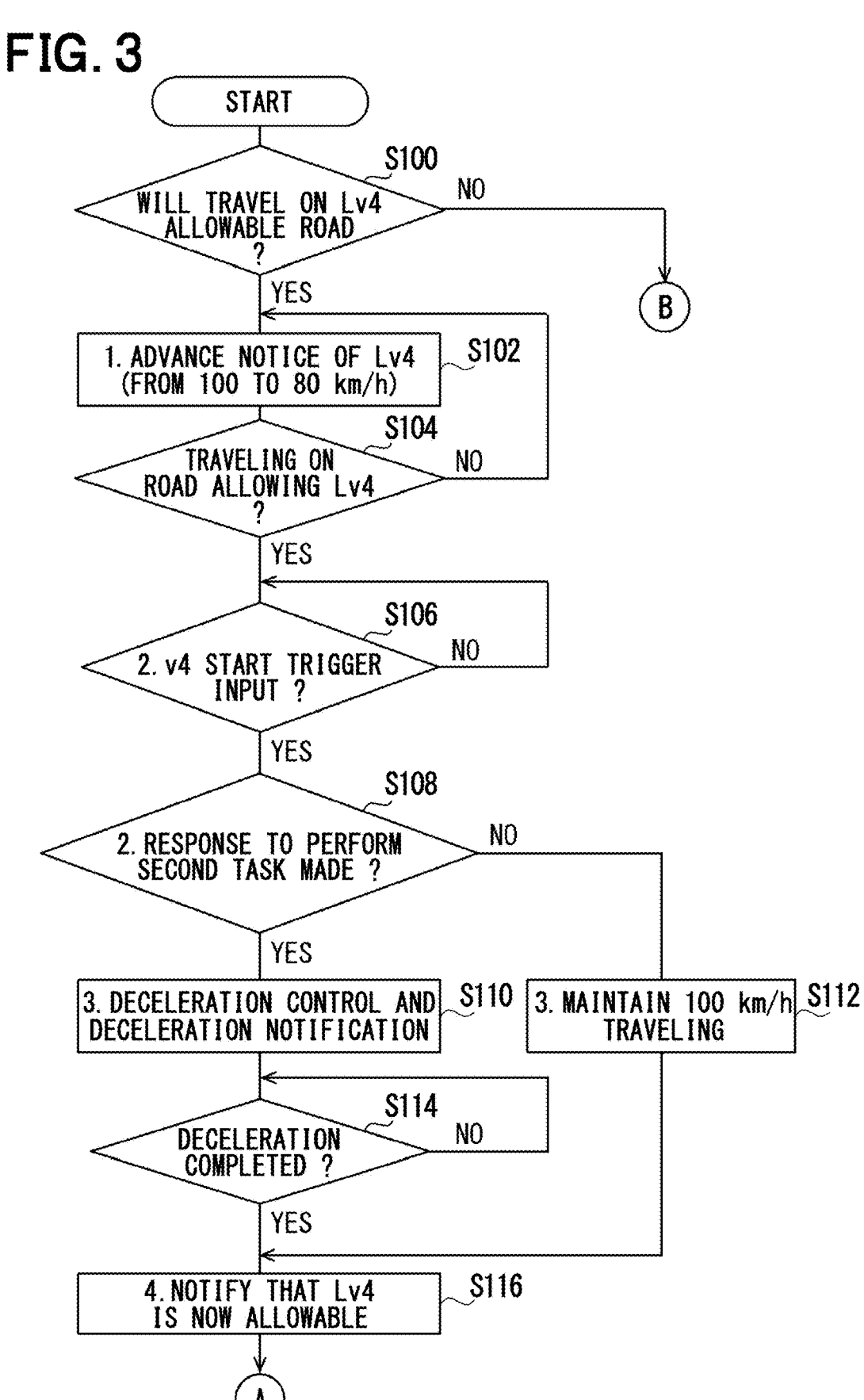
FIG. 3 is a flowchart showing the contents of the automatic drive control in the first embodiment (former)
Figure 4:
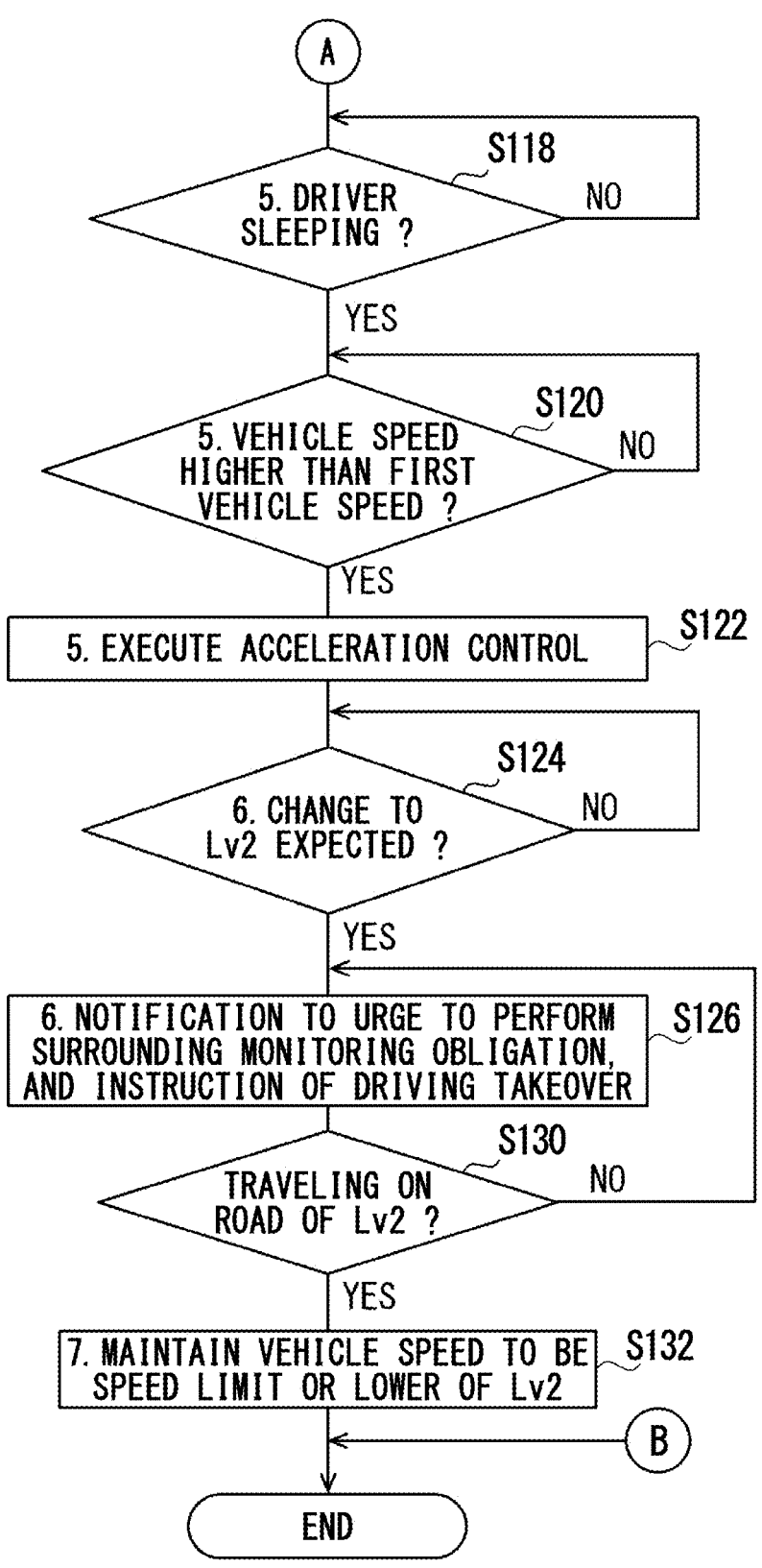
FIG. 4 is a flowchart showing the contents of the automatic drive control in the first embodiment (latter)

The vehicle control device 100 including the vehicular notification device 101 is configured as above, and the operation and function effects of this embodiment are now described further with reference to FIGS. 2 to 4. The configuration of the vehicle control device 100 of the following second or later embodiment is basically the same as that of this embodiment (first embodiment, FIG. 1).

As shown in FIG. 2, this embodiment is given with an exemplary case where the traveling road is, for example, an expressway, and a road is shifted from a road (first road) corresponding to the automatic driving level 2 or lower (hereinafter, automatic driving level 2) to a road (second road) allowing the automatic driving level 3 or higher (herein, automatic driving level 4), and further shifted to a road (first road) corresponding to the automatic driving level 2. In this case, the speed limit (first speed limit) of the road corresponding to the automatic driving level 2 is, for example, 100 km/h, and the speed limit (second speed limit) of the road corresponding to the automatic driving level 4 is, for example, 120 km/h. The vehicle speed on the road corresponding to the automatic driving level 2 corresponds to the first vehicle speed in the present disclosure, and the vehicle speed on the road corresponding to the automatic driving level 4 corresponds to the second vehicle speed in the disclosure.

The contents of control on the automatic driving performed by the control unit 70, and the contents of control on the notification performed by the HCU 160 are now described with reference to flowcharts shown in FIGS. 3 and 4.

The vehicle 10 is controlled to drive on a road corresponding to the automatic driving level 2 on the left side of FIG. 2 at a vehicle speed of, for example, 100 km/h at the automatic driving level 2. In step S100 (1 in FIG. 2), the control unit 70 determines whether the vehicle will travel ahead on a road allowing the automatic driving level 4 with no surrounding monitoring obligation and allowing a driver to sleep based on various types of information from the locator 30, the surrounding monitoring sensor 40, the on-vehicle communication device 50, and the like. When making a positive determination in step S100, the control unit 70 moves the processing to step S102, and when making a negative determination, it ends the control.

In step S102 (1 in FIG. 2), the control unit 70 instructs the HCU 160 to give an advance notice. The HCU 160 gives, to the driver, an advance notice of shift to the automatic driving level 4 using, for example, the meter display 120 or the audio device 140. The notification format can be an image (text) or audio, and the notification content can be, for example, "the driving level is shifted to the automatic driving level 4 ahead".

Further, in step S102, the HCU 160 notifies the driver by an image or audio that vehicle speed will be changed from 100 km/h to 80 km/h along with the automatic driving level 4. The notification content can be, for example, "vehicle speed will be changed from 100 km/h to 80 km/h ahead".

Subsequently, in step S104 (2 in FIG. 2), the control unit 70 determines whether the vehicle is traveling on a road allowing the automatic driving level 4 with no surrounding monitoring obligation. When making a positive determination in step S104, the control unit 70 moves the processing to step S106, and when making a negative determination, it returns the processing to step S102.

In step S106 (2 in FIG. 2), the control unit 70 determines whether a trigger is input by the driver to start the automatic driving level 4, i.e., whether input is performed using the operating device 60 for starting the automatic driving level 4. When making a negative determination in step S106, the control unit 70 repeats step S106, and when making a positive determination, it moves the processing to step S108.

In step S108 (2 in FIG. 2), the control unit 70 determines whether the driver has made a response (input instruction) to perform a second task (operating a smartphone, watching a movie, etc.). When making a positive determination in step S108, the control unit 70 moves the processing to step S110, and when making a negative determination (to continue the surrounding monitoring obligation), it moves the processing to step S112.

In step S110 (3 in FIG. 2), the control unit 70 performs deceleration control (change from 100 km/h to 80 km/h), and instructs the HCU 160 to notify the driver of deceleration control. The contents of the deceleration control notification can be, for example, "Deceleration will start", "Traveling speed will be changed from 100 km/h to 80 km/h.".

On the other hand, in step S112 (3 in FIG. 2), the control unit 70 maintains the vehicle speed (100 km/h) (double-dashed line in FIG. 2) because the driver does not request the second task. After step S112, the control unit 70 moves the processing to step S116 while skipping step S114.

Subsequently, in step S114 (4 in FIG. 2), the control unit 70 determines whether deceleration has been completed (whether the vehicle speed has reached the deceleration setting value of 80 km/h), and when making a positive determination, the control unit 70 moves the processing to step S116, when making a negative determination, it repeats step S114.

In step S116 (4 in FIG. 2), the control unit 70 instructs the HCU 160 to notify the driver that the automatic driving level 4 with no surrounding monitoring obligation is now allowable. The notification content can be, for example, "The driving level has been shifted to the automatic driving level 4. From here, the second task is allowed. You can sleep.".

Subsequently, in step S118 (5 in FIG. 2), the control unit 70 determines whether the driver among occupants is sleeping from image data of the occupants captured by the in-vehicle camera 45, and when making a positive determination, the control unit 70 moves the processing to step S120, and when making a negative determination, it repeats step S118.

In step S120 (5 in FIG. 2), the control unit 70 determines whether the second vehicle speed at the automatic driving level 4 is lower than the first vehicle speed at the automatic driving level 2, and when making a positive determination, the control unit 70 moves the processing to step S122, and when making a negative determination, it repeats step S120.

In other words, when making a positive determination in both steps S118 and S120, the control unit 70 executes acceleration control in step S122 (5 in FIG. 2).

The contents of the acceleration control are as follows: the second vehicle speed at the automatic driving level 4 is (1) made higher than the first vehicle speed at the automatic driving level 2 (120 km/h), (2) made equal to the first vehicle speed (100 km/h), or (3) made lower than the first vehicle speed and higher than the current second vehicle speed (approximately 90 km/h).

In step S124 (6 in FIG. 2), the control unit 70 determines whether change from the automatic driving level 4 with no surrounding monitoring obligation and allowing the driver to sleep to the automatic driving level 2 with the surrounding monitoring obligation has been expected. When making a positive determination, the control unit 70 moves the processing to step S126, and when making a negative determination, it repeats step S124.

In step S126 (6 in FIG. 2), the control unit 70 instructs the HCU 160 to give a notification to the driver. The HCU 160 gives a notification to urge the driver to perform the surrounding monitoring obligation, and gives a notification to the driver for driving takeover. The contents of the notification to urge the driver to perform the surrounding monitoring obligation can be, for example, "Driving level will be shifted to the automatic driving level 2. Surrounding monitoring is required.". The contents of the notification for driving takeover can be "Be ready for the automatic driving level 2.".

Subsequently, in step S130 (7 in FIG. 2), the control unit 70 determines whether the vehicle is traveling on a road of the automatic driving level 2 with the surrounding monitoring obligation. When making a positive determination, the control unit 70 moves the processing to step S132, and when making a negative determination, it repeats steps S126 and S130.

In step S132 (7 in FIG. 2), the control unit 70 maintains the vehicle speed set by the acceleration control executed in step S122 to be the speed limit or lower on the road of the automatic driving level 2. For example, when the vehicle speed is set to 120 km/h by the acceleration control, the vehicle speed is adjusted to 100 km/h. When the vehicle speed is set to 100 km/h by the acceleration control, the vehicle speed is maintained at 100 km/h. When the vehicle speed is set to 90 km/h by the acceleration control, the vehicle speed is maintained at 90 km/h.

As described above, in this embodiment, when a driver is determined to be asleep in the second automatic driving state, and when the vehicle is traveling at a speed lower than the first vehicle speed, acceleration control is performed, and thus it is possible to change the vehicle speed to a higher side within the speed limit without causing the driver to feel anxiety.

Second Embodiment

Figure 5:
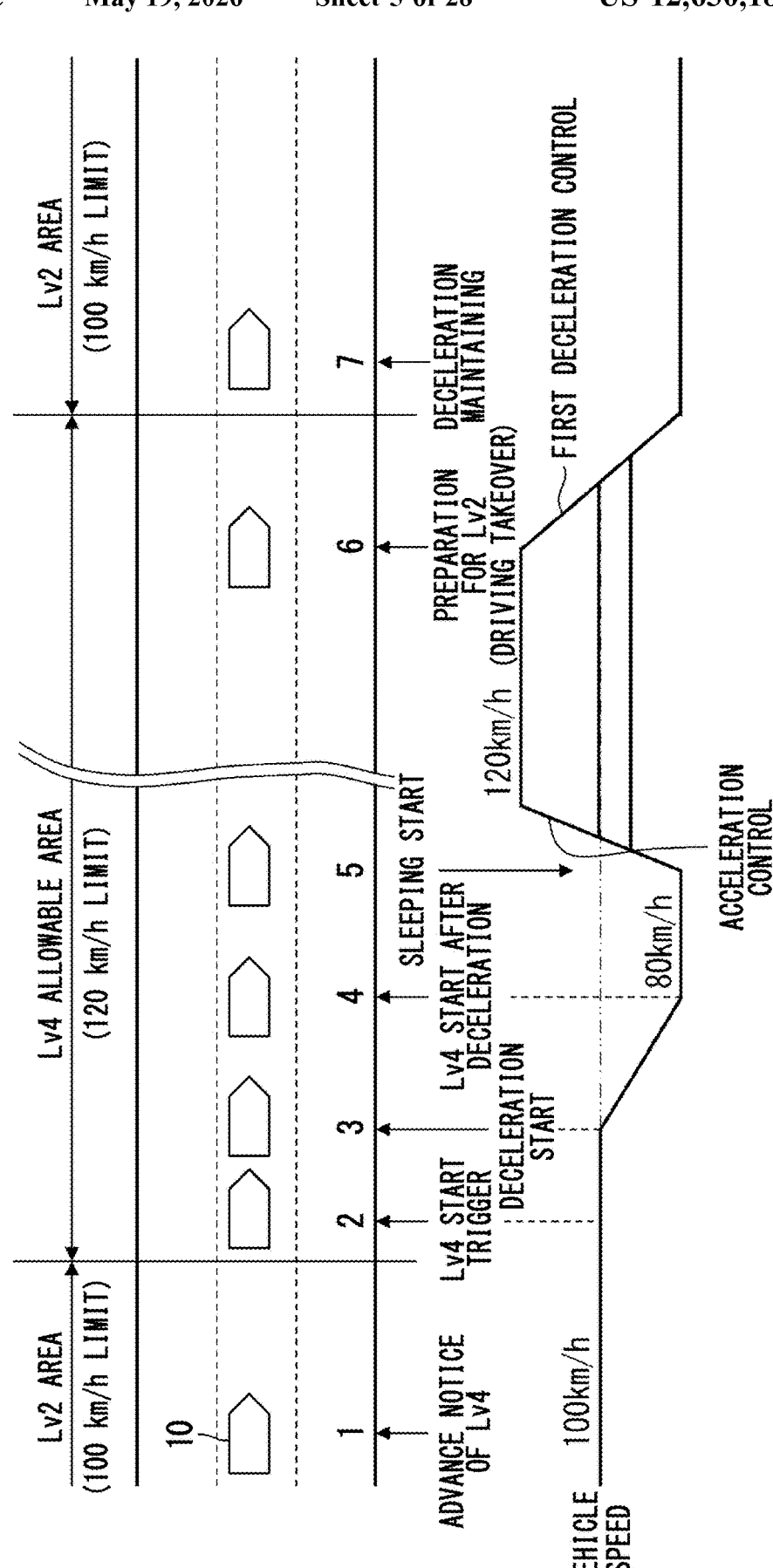
FIG. 5 is a schematic illustration of the contents of automatic drive control in the second embodiment.
Figure 6:
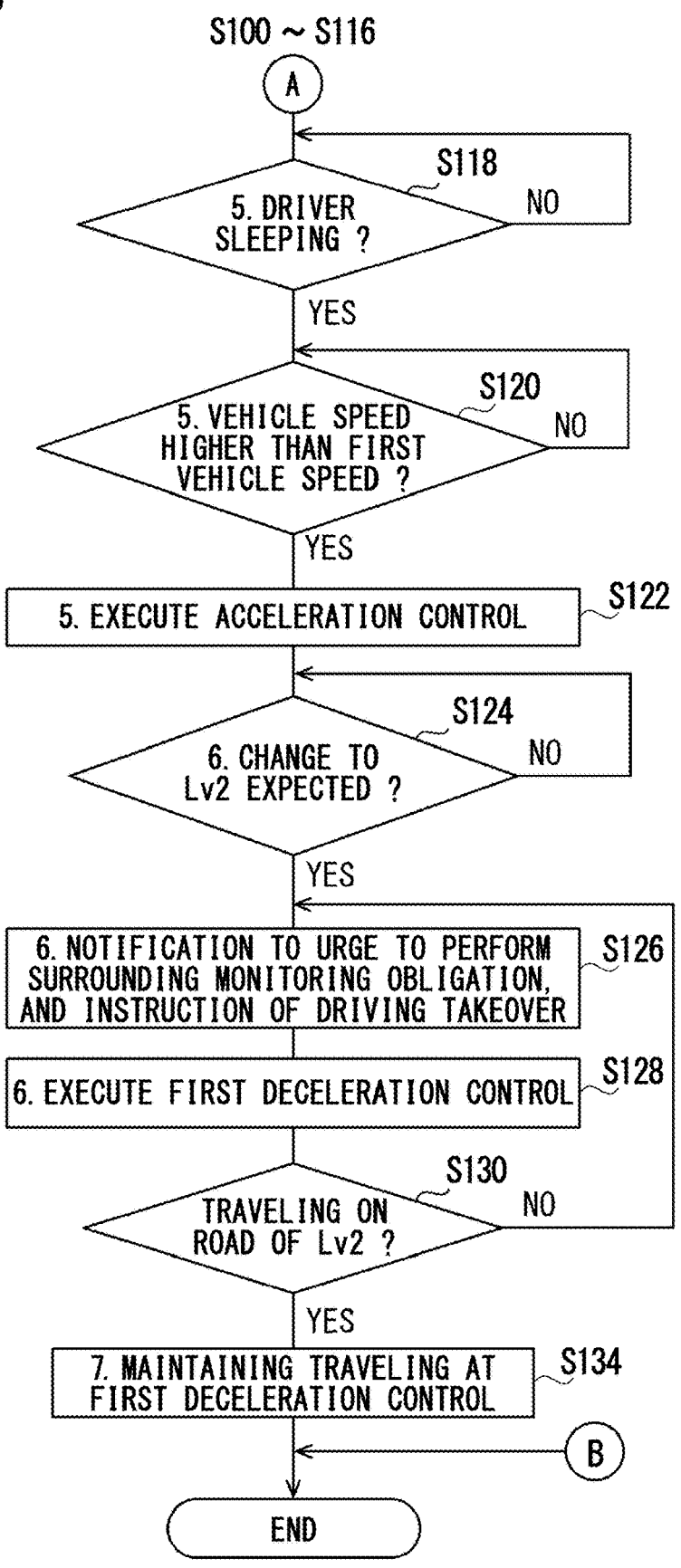
FIG. 6 is a flowchart showing the contents of the automatic drive control in the second embodiment (latter)

A second embodiment is shown in FIGS. 5 and 6. As shown in FIG. 5, the second embodiment is the same as the first embodiment, except that the control unit 70 executes first deceleration control.

In the flowchart in the second embodiment shown in FIG. 6, step S128 is added, and step S132 is changed to step S134 in the flowcharts described in the first embodiment (FIGS. 3 and 4). Steps S100 to S116 are the same as in FIG. 3, and are thus omitted from steps for explanation of the second embodiment, and only FIG. 6 is shown.

After steps S100 to S120, the control unit 70 executes acceleration control in step S122 (5 in FIG. 5), and then in step S124 (6 in FIG. 5), determines whether change from the automatic driving level 4, having no surrounding monitoring obligation and allowing the driver to sleep, to the automatic driving level 2 with the surrounding monitoring obligation has been expected.

When making a positive determination in step S124, the control unit 70 instructs the HCU 160 to give a notification to the driver in step S126 (6 in FIG. 5). The HCU 160 gives a notification to urge the driver to perform the surrounding monitoring obligation, and gives a notification to the driver for driving takeover.

In step S128 (6 in FIG. 5), the control unit 70 executes first deceleration control. In the first deceleration control, when the driving state is shifted to the first automatic driving state after executing the acceleration control, the vehicle speed is changed to a vehicle speed (e.g., 80 km/h) lower than the first vehicle speed (e.g., 100 km/h) before starting the second automatic driving state.

When determining in step S130 that the vehicle is traveling on the road of the automatic driving level 2, the control unit 70 maintains the vehicle speed reduced by the first deceleration control in step S134 (7 in FIG. 5).

As a result, execution of the first deceleration control (reducing the second vehicle speed) makes it possible to perform driving takeover safely during shift from the automatic driving level 4 to the automatic driving level 2, and to reduce driver's anxiety.

Modifications of First and Second Embodiments

For the first and second embodiments, when determining that one or more passenger other than the driver exists as an occupant, and when determining that at least one passenger is awake, based on detection results of the in-vehicle camera 45 (detection unit), the control unit 70 should prohibit execution of the acceleration control.

In such a case, with respect to FIGS. 2 and 5, the vehicle speed (for example, 80 km/h) reduced for the automatic driving level 4 is maintained and continued to the subsequent automatic driving level 2.

As a result, even when the driver is sleeping, acceleration control is prohibited when there is a passenger being awake, and thus the passenger being awake is prevented from feeling anxiety due to acceleration.

Third Embodiment

Figure 7:
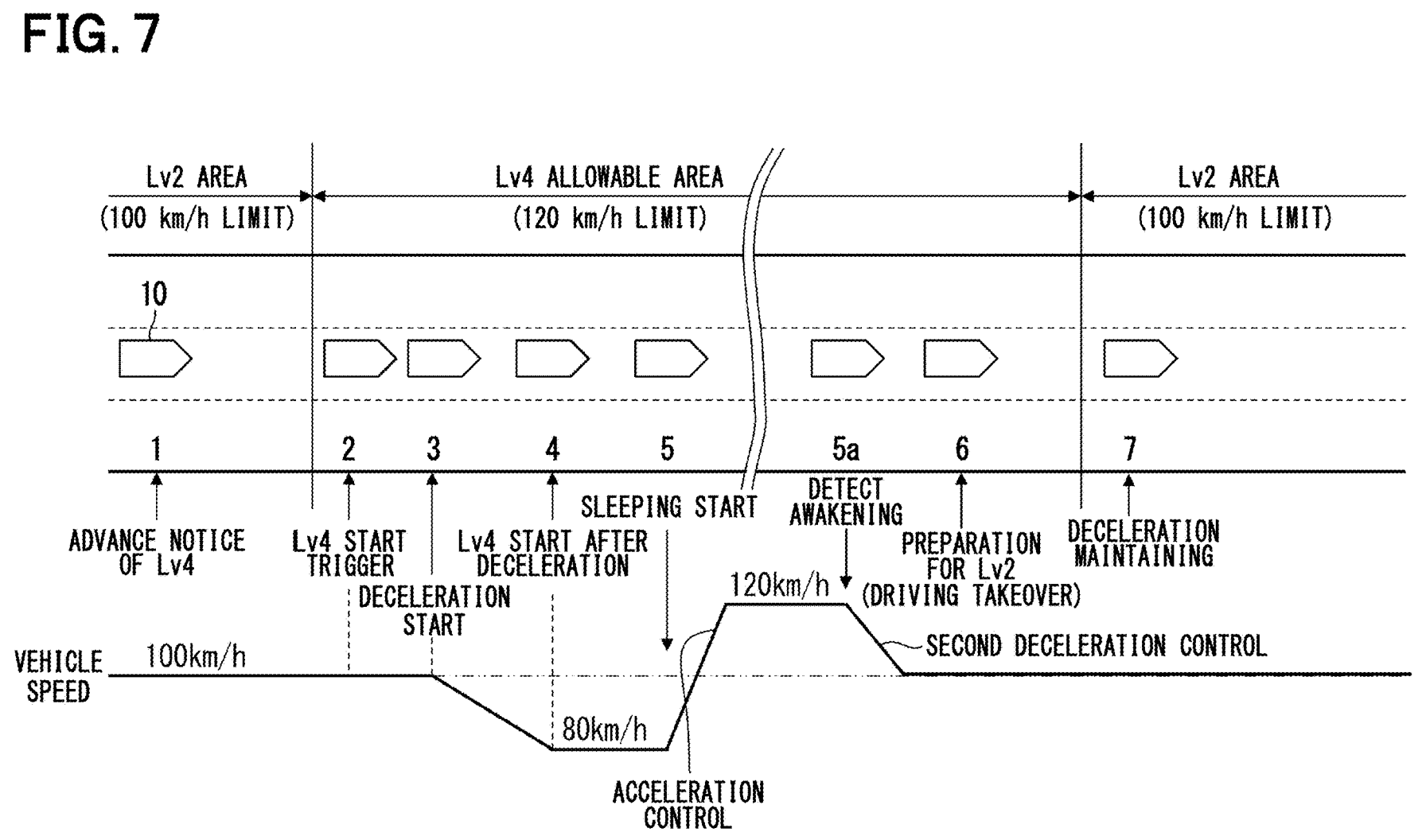
Figure 9:
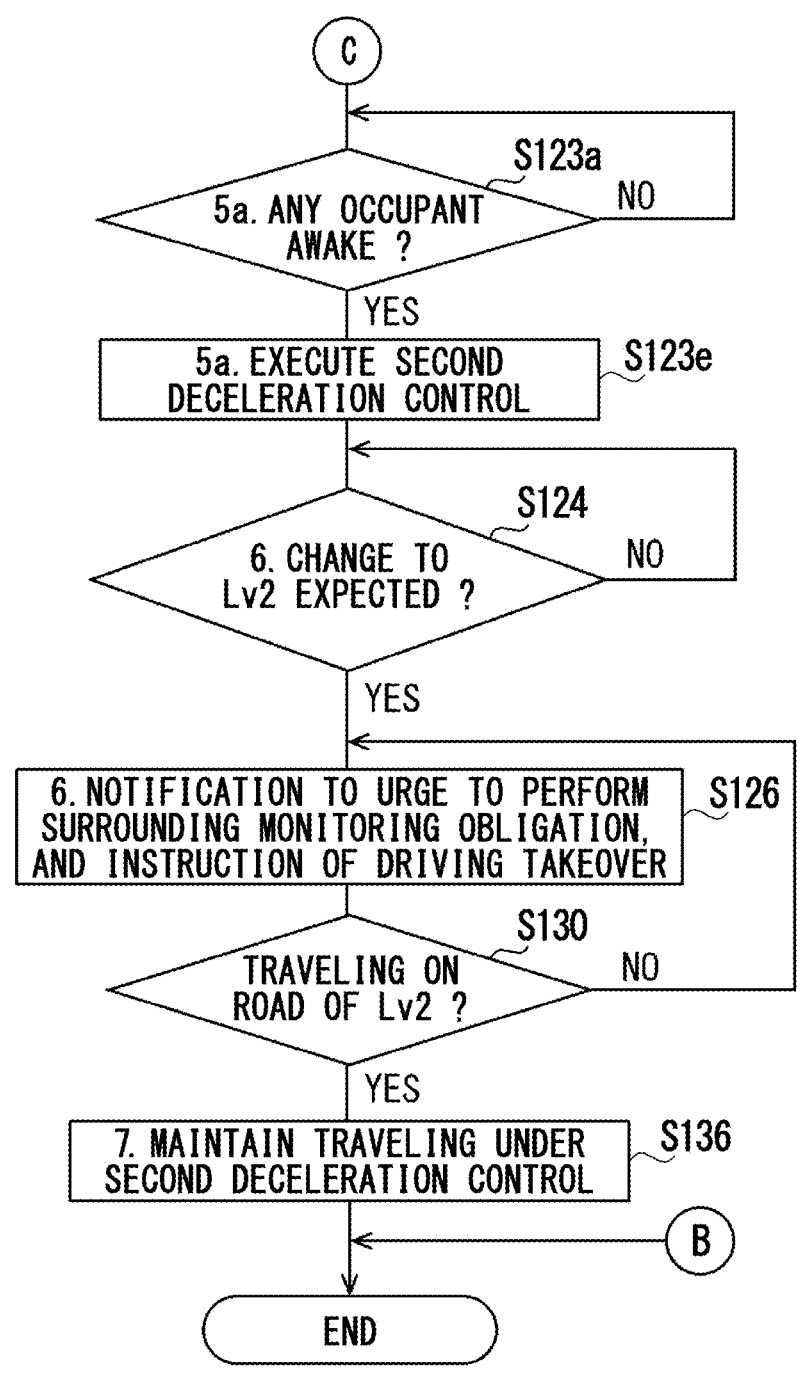
FIG. 9 is a flowchart showing the contents of the automatic drive control in the third embodiment (latter)

A third embodiment is shown in FIGS. 7 and 9. As shown in FIG. 7, the third embodiment is the same as the first embodiment, except that the control unit 70 executes second deceleration control instead of the first deceleration control.

Figure 8:
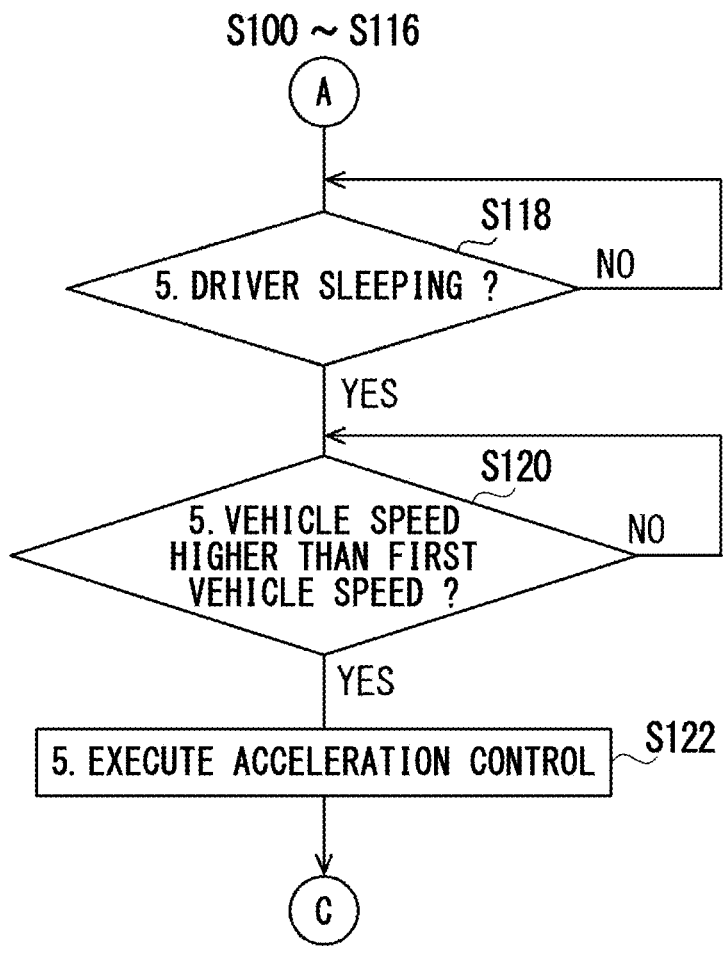
FIG. 8 is a flowchart showing the contents of automatic drive control in the third embodiment (middle)

In the flowcharts in the third embodiment shown in FIGS. 8 and 9, steps S123a to S123e are added, and step S132 is replaced with step S136 in the flowcharts described in the first embodiment (FIGS. 3 and 4). Steps S100 to S116 are the same as in FIG. 3, and are thus omitted from steps for explanation of the third embodiment, and FIGS. 8 and 9 are shown.

After executing acceleration control in step S122 (5 in FIG. 7), the control unit 70 determines whether at least one of the occupants is awake based on image data of the occupants acquired by the in-vehicle camera 45 in step S123a (5a in FIG. 7).

When making a positive determination in step S123a, the control unit 70 executes the second deceleration control in step S123e (5a in FIG. 7). In the second deceleration control, when an occupant is awake after the acceleration control as described above, vehicle speed is decelerated to a predetermined vehicle speed (for example, 100 km/h).

After steps S124, S126, and S130, the control unit 70 maintains the vehicle speed at the automatic driving level 2 at a predetermined vehicle speed set by the second deceleration control in step S136 (7 in FIG. 7).

As a result, executing the second deceleration control (reducing the second vehicle speed) allows the occupant being awake to view surrounding scenery relaxedly.

Fourth Embodiment

Figure 10:
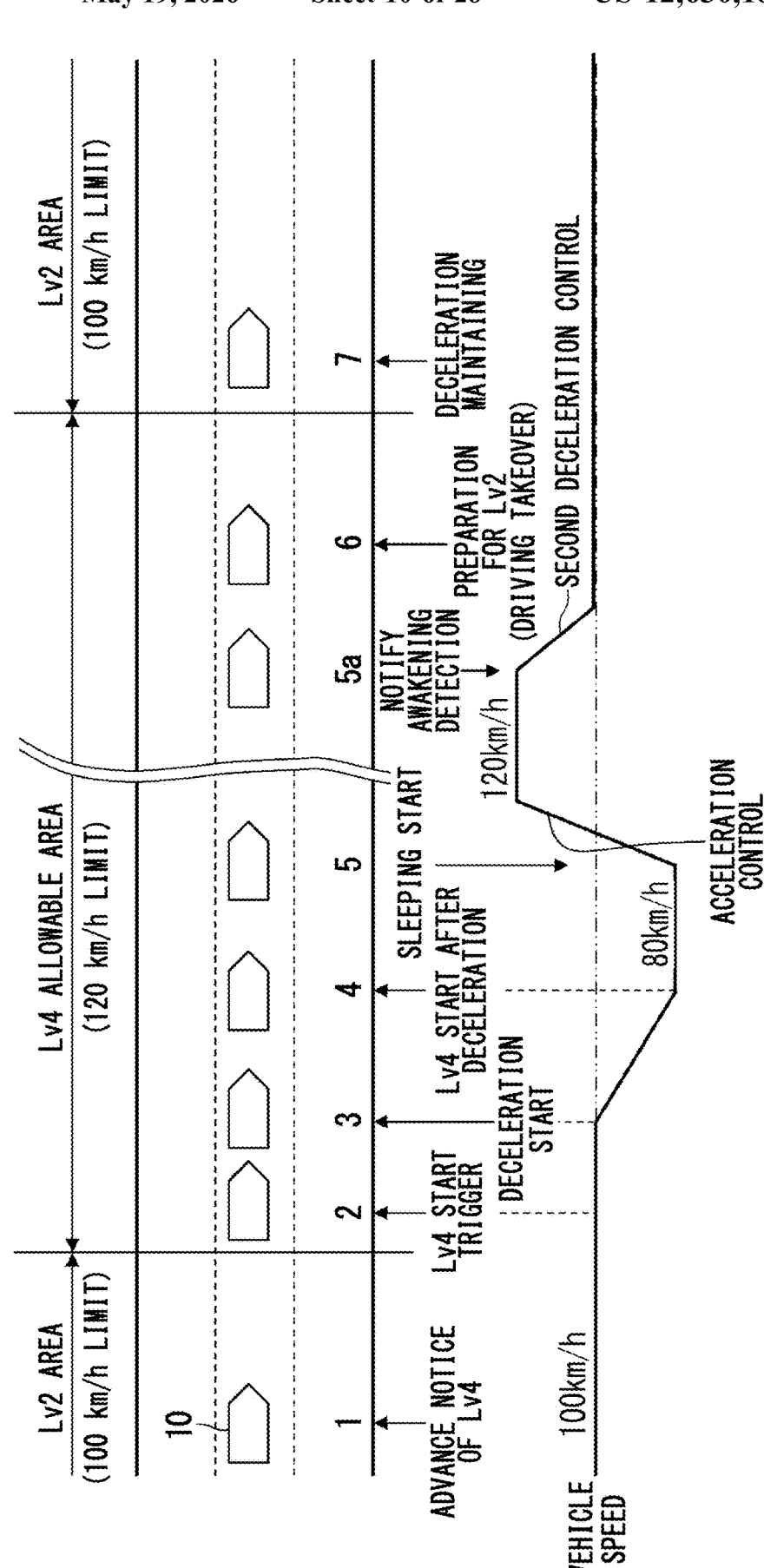
FIG. 10 is a schematic illustration of the contents of automatic drive control in the fourth embodiment.
Figure 11:
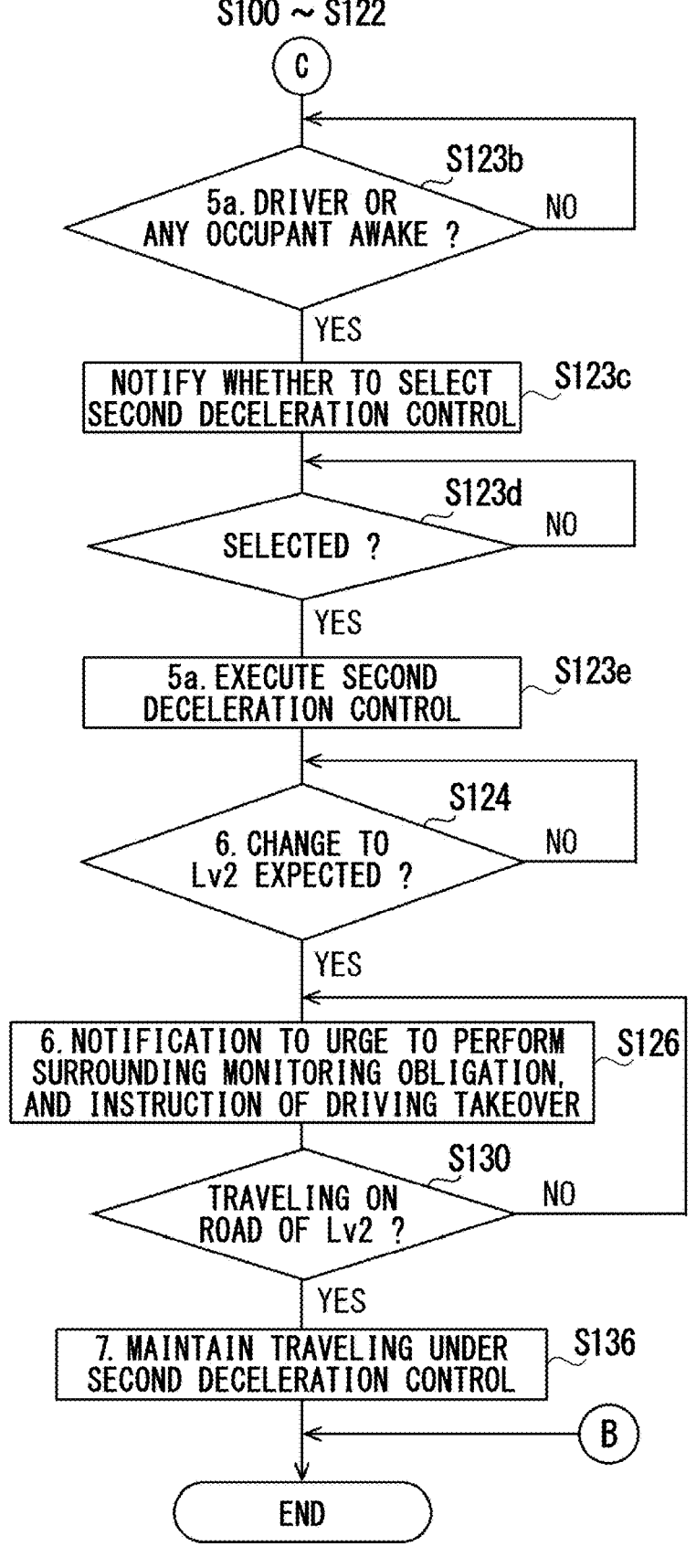
FIG. 11 is a flowchart showing the contents of the automatic drive control in the fourth embodiment (latter)

A fourth embodiment is shown in FIGS. 10 and 11. As shown in FIG. 10, the fourth embodiment is the same as the third embodiment, except that after executing the acceleration control, when determining that the driver and at least one passenger among occupants are awake, the control unit 70 uses the notification unit 105 to notify the driver to select whether or not to execute the second deceleration control for reducing the vehicle speed after the acceleration control to a predetermined vehicle speed.

The flowchart in the fourth embodiment shown in FIG. 11 is the same as the flowchart described in the third embodiment (FIGS. 8 and 9), except that steps S123a to S123e are replaced with steps S123b to S123d. Steps S100 to S122 are the same as in FIG. 8, and are thus omitted from steps for explanation of the fourth embodiment, and FIG. 11 is shown.

After executing the acceleration control in step S122 (5 in FIG. 10), the control unit 70 determines whether the driver and at least one passenger among the occupants are awake from image data of the occupants acquired by the in-vehicle camera 45 in step S123b (5a in FIG. 10).

When making a positive determination in step S123b, the control unit 70 uses the notification unit 105 to instruct the HCU 160 to notify the driver to select whether to execute the second deceleration control, in step S123c (5a in FIG. 10).

When determining in step S123d that the driver has selected to execute the second deceleration control with the operating device 60, the control unit 70 executes the second deceleration control in step S123e.

After steps S124, S126, and S130, the control unit 70 maintains the vehicle speed at the automatic driving level 2 at a predetermined vehicle speed set by the second deceleration control in step S136 (7 in FIG. 10).

As a result, when the driver and at least one passenger are awake after the acceleration control, since the driver is caused to select execution of the second deceleration control and executes the second deceleration control, the driver can give consideration to the passenger, and the passenger being awake can view surrounding scenery relaxedly.

Fifth Embodiment

Figure 12:
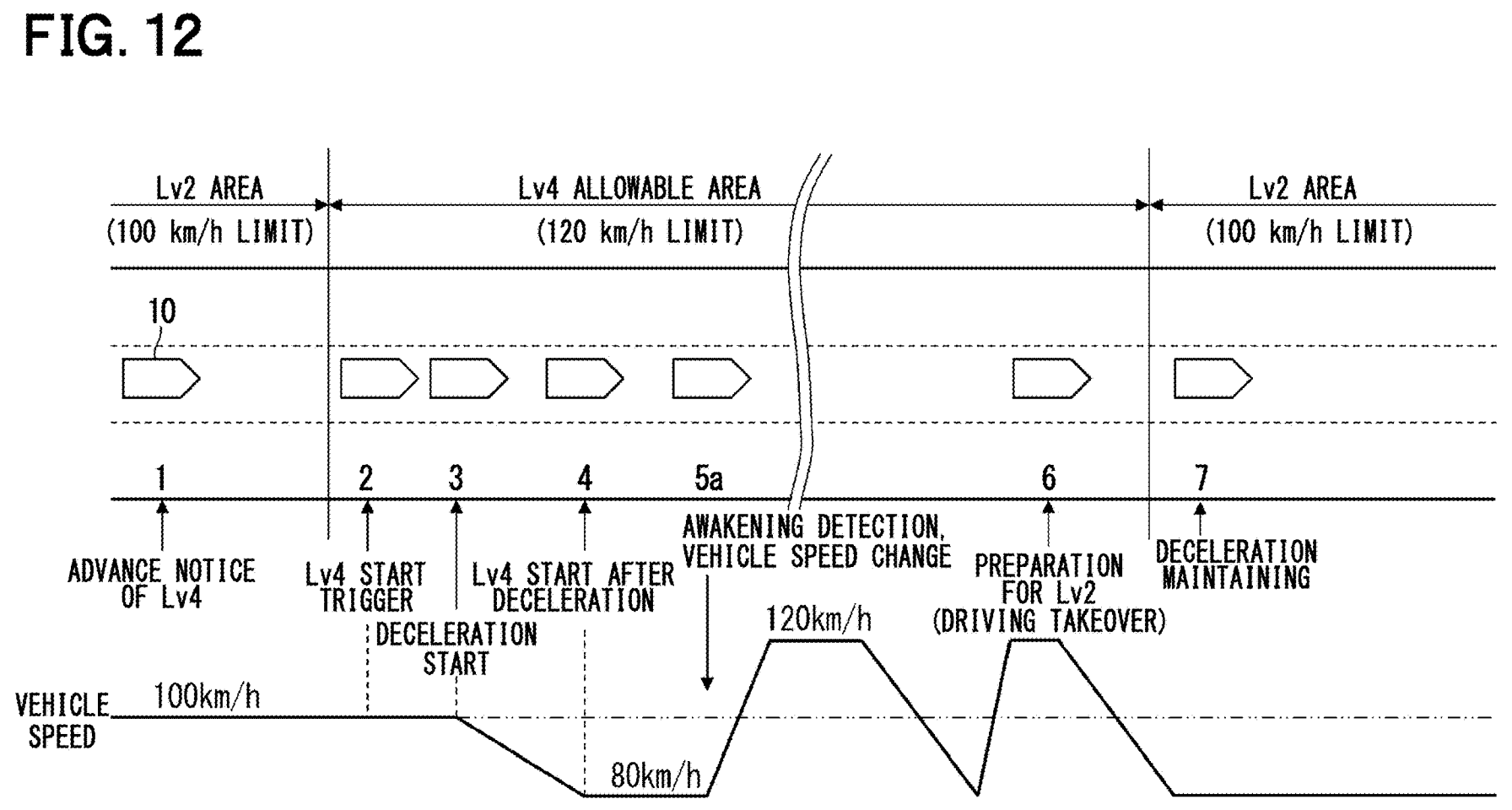
Figure 13:
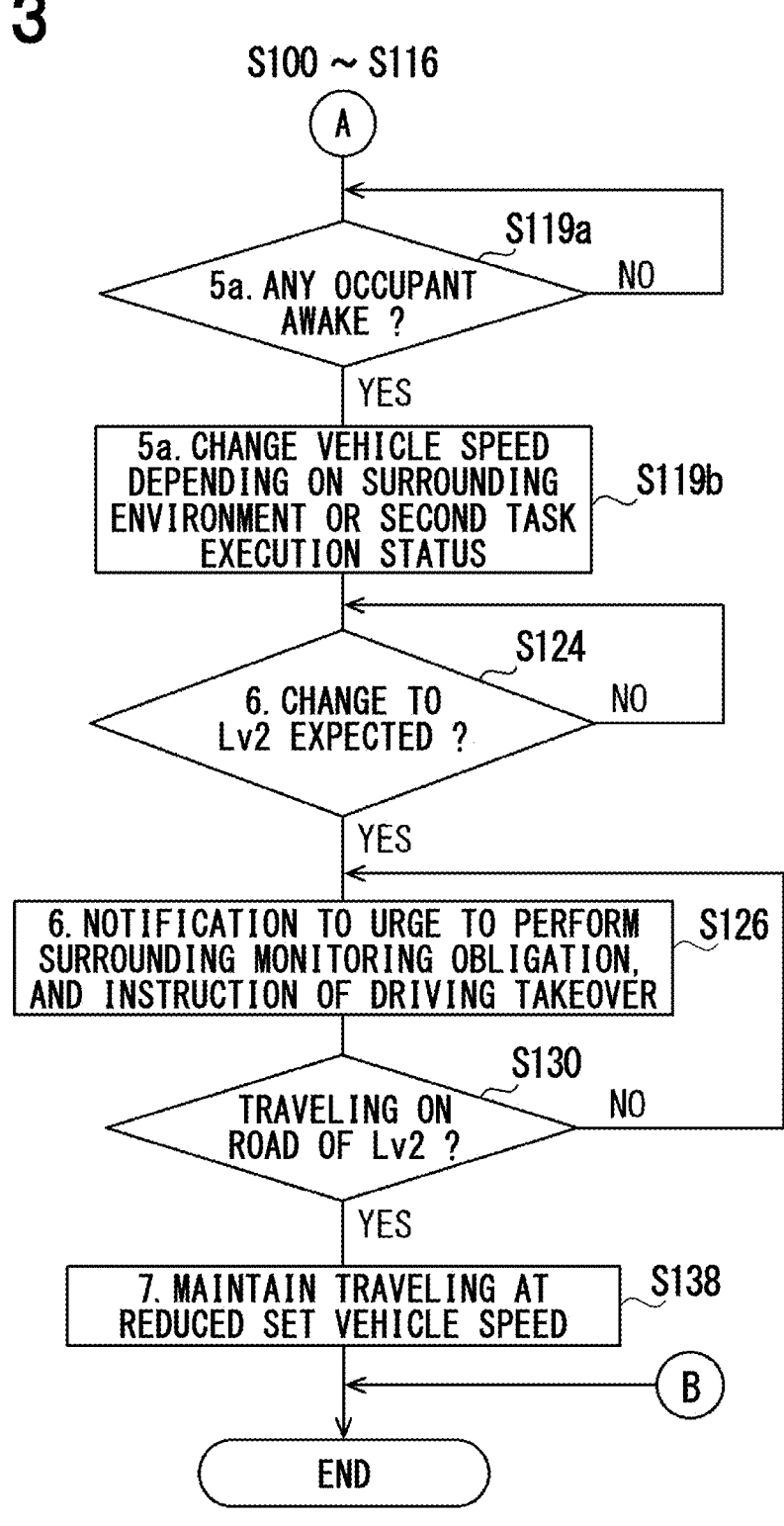
FIG. 13 is a flowchart showing the contents of the automatic drive control in the fifth embodiment (latter)

A fifth embodiment is shown in FIGS. 12 and 13. In the fifth embodiment, as shown in FIG. 12, when determining based on detection results of the in-vehicle camera 45 that the occupant is awake in the second automatic driving state, the control unit 70 changes the vehicle speed in the second automatic driving state depending on the surrounding environment or execution status of the second task of the occupant.

The flowchart in the fifth embodiment shown in FIG. 13 is the same as the flowchart described in the first embodiment (FIGS. 3 and 4), except that steps S118 to S122 are replaced with steps S119a to S119b, and step S132 is replaced with step S138. Steps S100 to S116 are the same as in FIG. 3, and are thus omitted from steps for explanation of the fifth embodiment, and FIG. 13 is shown.

After steps S100 to S116, in the second automatic driving state, the control unit 70 determines in step S119a (5a in FIG. 12) whether an occupant is awake based on image data of the occupant acquired by the in-vehicle camera 45.

When making a positive determination in step S119a, in step S119b (5a in FIG. 12), the control unit 70 changes the vehicle speed (accelerates or decelerates) in the second automatic driving state depending on the surrounding environment acquired by the surrounding monitoring sensor 40, or an execution status, acquired by the in-vehicle camera 45, of the second task, which is allowed in the second automatic driving state, of the occupant.

In changing the vehicle speed, for example, the control unit 70 decelerates in a scenic spot as the surrounding environment, and accelerates in a place, as the surrounding environment, other than the scenic spot. The place other than the scenic spot refers to a location that is not suitable for viewing the surrounding scenery while driving, such as the inside of a tunnel or an area where a soundproof wall is continuously provided on the side of a road. Alternatively, when changing vehicle speed, the control unit 70 decelerates at the time when the second task of the occupant is completed. Although FIG. 12 shows that acceleration is performed immediately after deceleration, this is merely schematic representation, and a case where a reduced vehicle speed is maintained for a predetermined time after deceleration is naturally possible.

After steps S124 and S126, when determining in step S130 that the vehicle is traveling on a road of the automatic driving level 2, the control unit 70 maintains traveling at the reduced vehicle speed in step S138.

As a result, the vehicle speed in the second automatic driving state is changed depending on the awake state of the occupant, the surrounding environment during traveling, or the execution status of the second task of an occupant, thereby the occupant can view the surrounding scenery relaxedly without anxiety.

In other words, at a scenic spot, the vehicle is decelerated so that the surrounding scenery can be seen easily, and at an area other than the scenic spot, there is no need to view the scenery and the vehicle can be accelerated to pass through the area. In addition, the vehicle is decelerated at the time when the second task of an occupant is completed, so that the occupant can view the surrounding scenery relaxedly.

Sixth Embodiment

Figure 14:
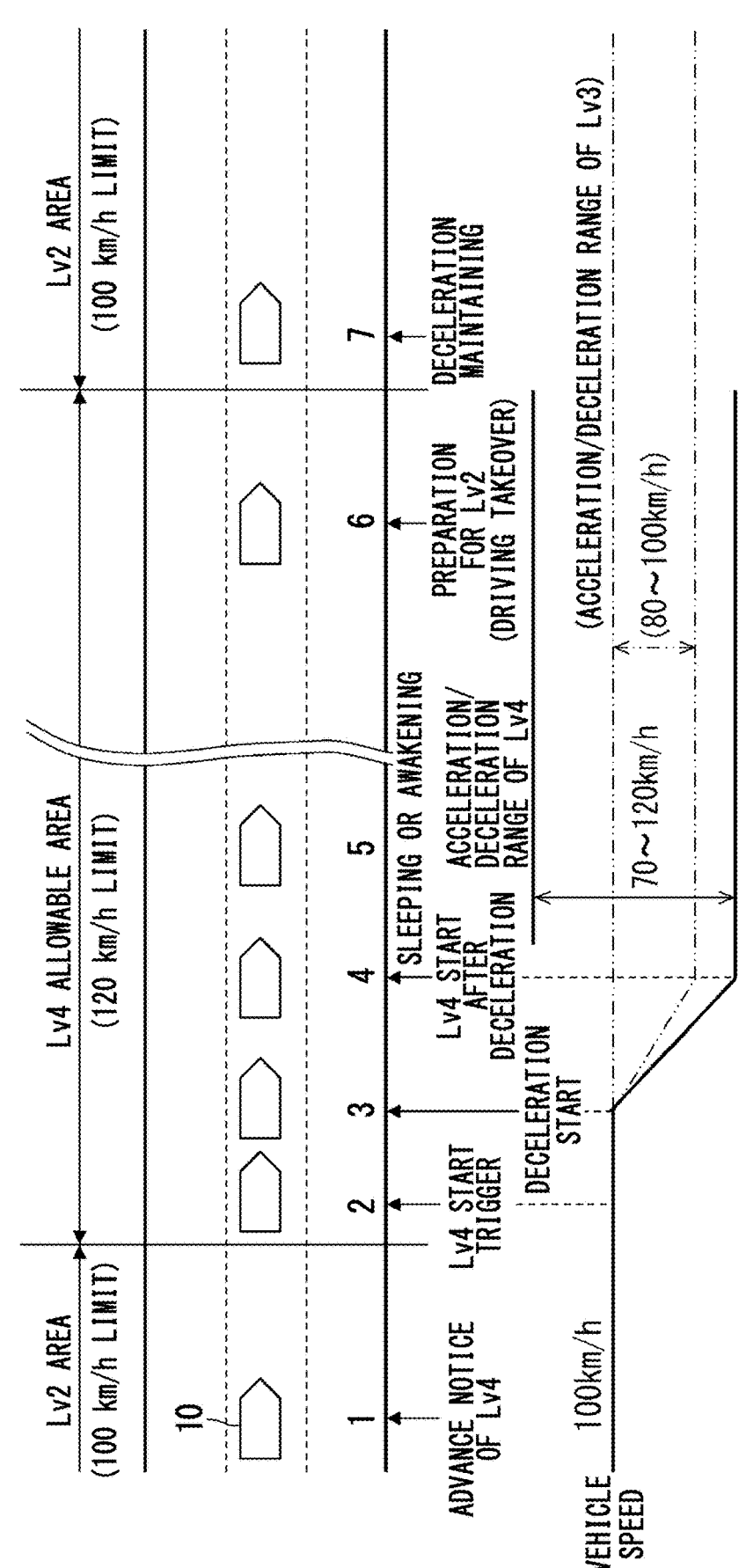
FIG. 14 is a schematic illustration of the contents of automatic drive control in the sixth embodiment.

A sixth embodiment is shown in FIG. 14. In the sixth embodiment, as shown in FIG. 14, the control unit 70 makes the acceleration/deceleration range of the set vehicle speed in the second automatic driving state at the automatic driving level 4 to be wider than the acceleration/deceleration range of the set vehicle speed in the third automatic driving state at the automatic driving level 3.

The acceleration/deceleration range refers to the width (difference) between the lower limit vehicle speed and the upper limit vehicle speed of each of the set vehicle speeds at the automatic driving levels 3 and 4. For example, when the acceleration/deceleration range at the automatic driving level 3 is set to be from the lower-limit vehicle speed of 80 km/h to the upper-limit vehicle speed of 100 km/h (difference of 20 km/h), the acceleration/deceleration range at the automatic driving level 4 is set to be from the lower-limit vehicle speed of 70 km/h to the upper-limit vehicle speed of 120 km/h (difference of 50 km/h). The lower-limit vehicle speed at the automatic driving level 4 is lower than the lower-limit vehicle speed at the automatic driving level 3, and the upper-limit vehicle speed at the automatic driving level 4 is higher than the upper-limit vehicle speed at the automatic driving level 3.

As a result, the acceleration/deceleration range of the set vehicle speed at the automatic driving level 4 is widened compared to that at the automatic driving level 3, thereby the degree of acceleration or deceleration can be set larger, and thus set speed can be changed flexibly, allowing smooth traveling.

Seventh Embodiment

Figure 15:
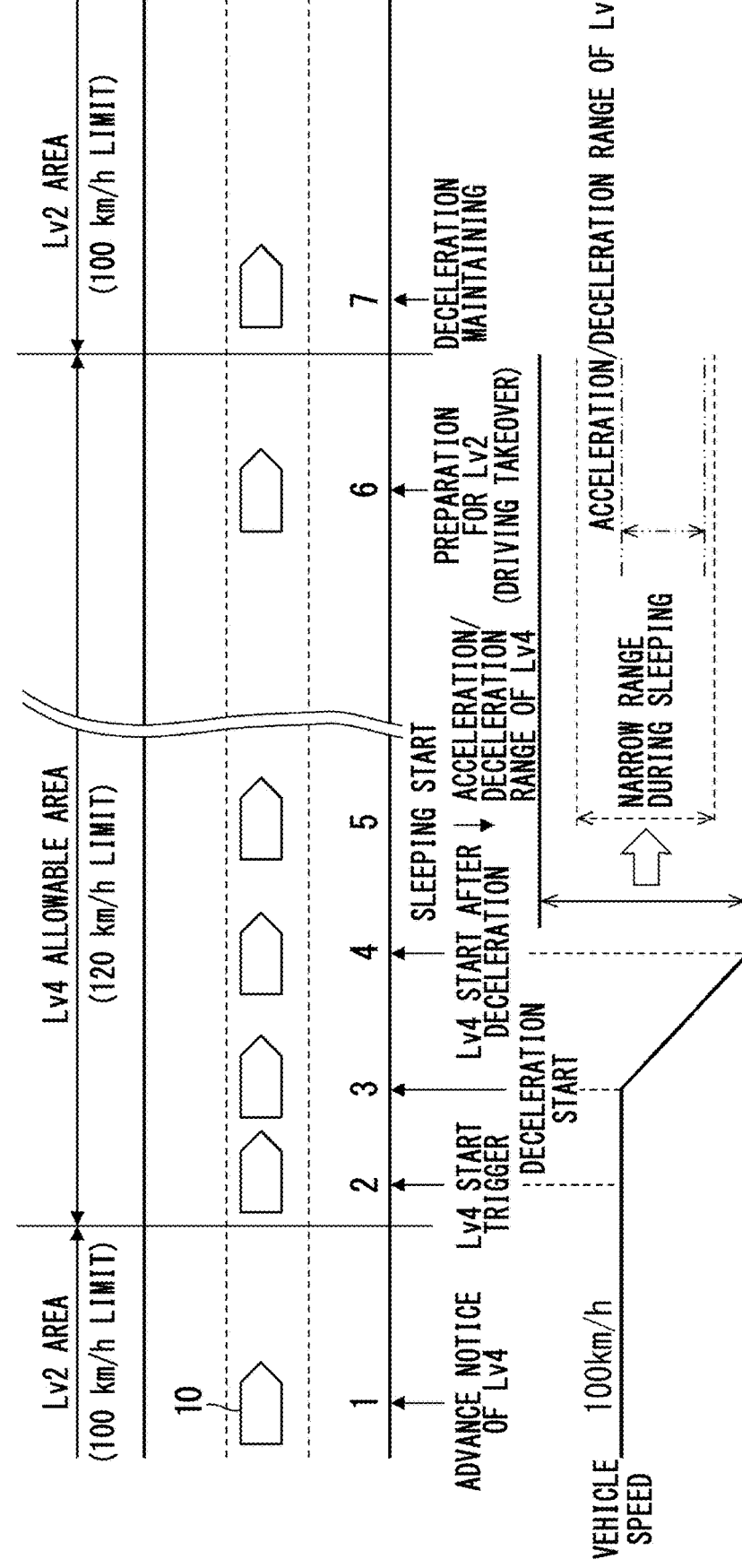
FIG. 15 is a schematic illustration of the contents of automatic drive control in the seventh embodiment.

A seventh embodiment is shown in FIG. 15. In the seventh embodiment, as shown in FIG. 15, the control unit 70 adjusts the acceleration/deceleration range at the automatic driving level 4 (second automatic driving state) depending on whether an occupant is awake or asleep, based on detection results of the in-vehicle camera 45 (detection section).

Specifically, when the occupant is sleeping, the control unit 70 changes the acceleration/deceleration range at the automatic driving level 4 to be narrower. The changed acceleration/deceleration range at the automatic driving level 4 is wider than the acceleration/deceleration range at the automatic driving level 3.

As a result, when the occupant is sleeping at the automatic driving level 4, the degree of acceleration/deceleration is reduced, making it possible to reduce movement of the vehicle 10 and prevent occupant's sleep from being disturbed.

Eighth Embodiment

Figure 16:
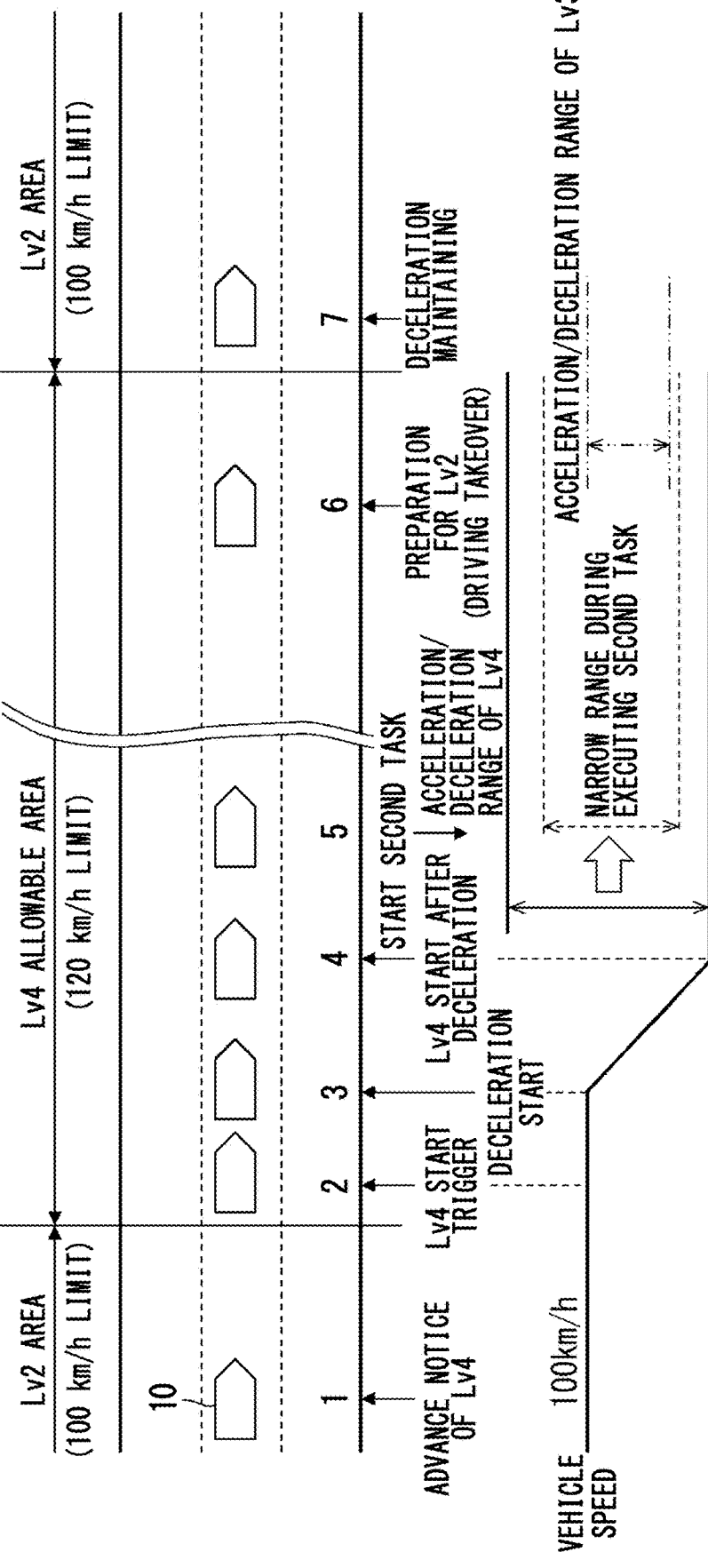
FIG. 16 is a schematic illustration of the contents of automatic drive control in the eighth embodiment.

An eighth embodiment is shown in FIG. 16. An occupant is permitted to perform the second task at the automatic driving level 4 (second automatic driving state). In the eighth embodiment, as shown in FIG. 16, the control unit 70 adjusts the acceleration/deceleration range at the automatic driving level 4 depending on an execution status of the second task of an occupant, acquired by the in-vehicle camera 45 (detection unit).

Specifically, when the occupant is executing the second task, the control unit 70 changes the acceleration/deceleration range at the automatic driving level 4 to be narrower. The changed acceleration/deceleration range at the automatic driving level 4 is wider than the acceleration/deceleration range at the automatic driving level 3.

As a result, when the occupant is executing the second task at the automatic driving level 4, since the degree of acceleration/deceleration is reduced, movement of the vehicle 10 can be reduced so that the second task of the occupant is not disturbed.

Ninth Embodiment

Figure 17:
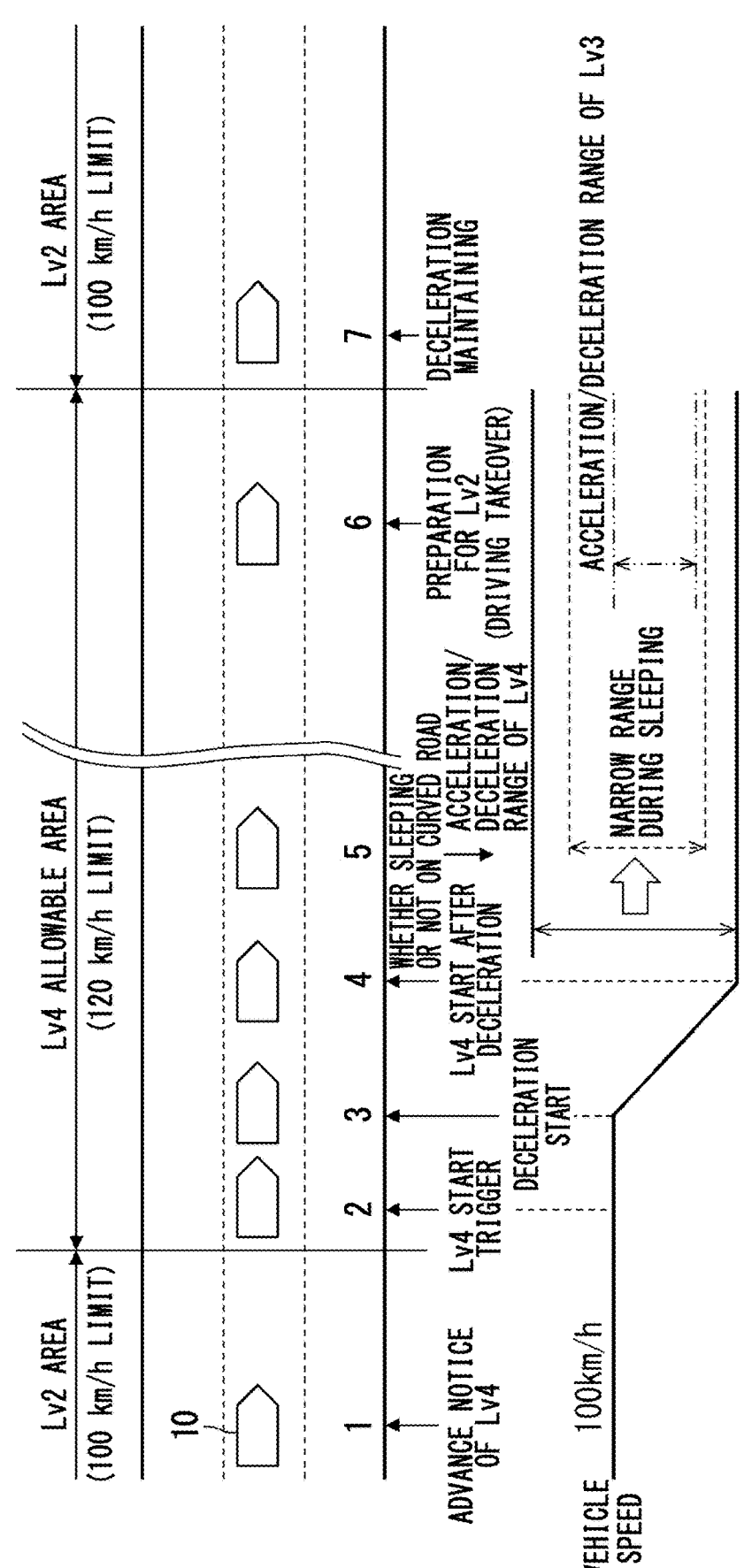
FIG. 17 is a schematic illustration of the contents of automatic drive control in the ninth embodiment.

A ninth embodiment is shown in FIG. 17. In the ninth embodiment, as shown in FIG. 17, in traveling on a curved road at the automatic driving level 4 (second automatic driving state), the control unit 70 adjusts the acceleration/deceleration range depending on whether an occupant is awake or asleep.

Specifically, when the vehicle travels on a curved road at the automatic driving level 4, and when the occupant is sleeping, the control unit 70 changes the acceleration/deceleration range to be narrowed. The changed acceleration/deceleration range at the automatic driving level 4 is wider than the acceleration/deceleration range at the automatic driving level 3.

As a result, when the vehicle 10 travels on a curved road at the automatic driving level 4, and when the occupant is sleeping, the degree of lateral acceleration due to centrifugal force is reduced, making it possible to suppress movement of the vehicle 10 and thus prevent sleep of the occupant from being disturbed.

Tenth Embodiment

Figure 18:
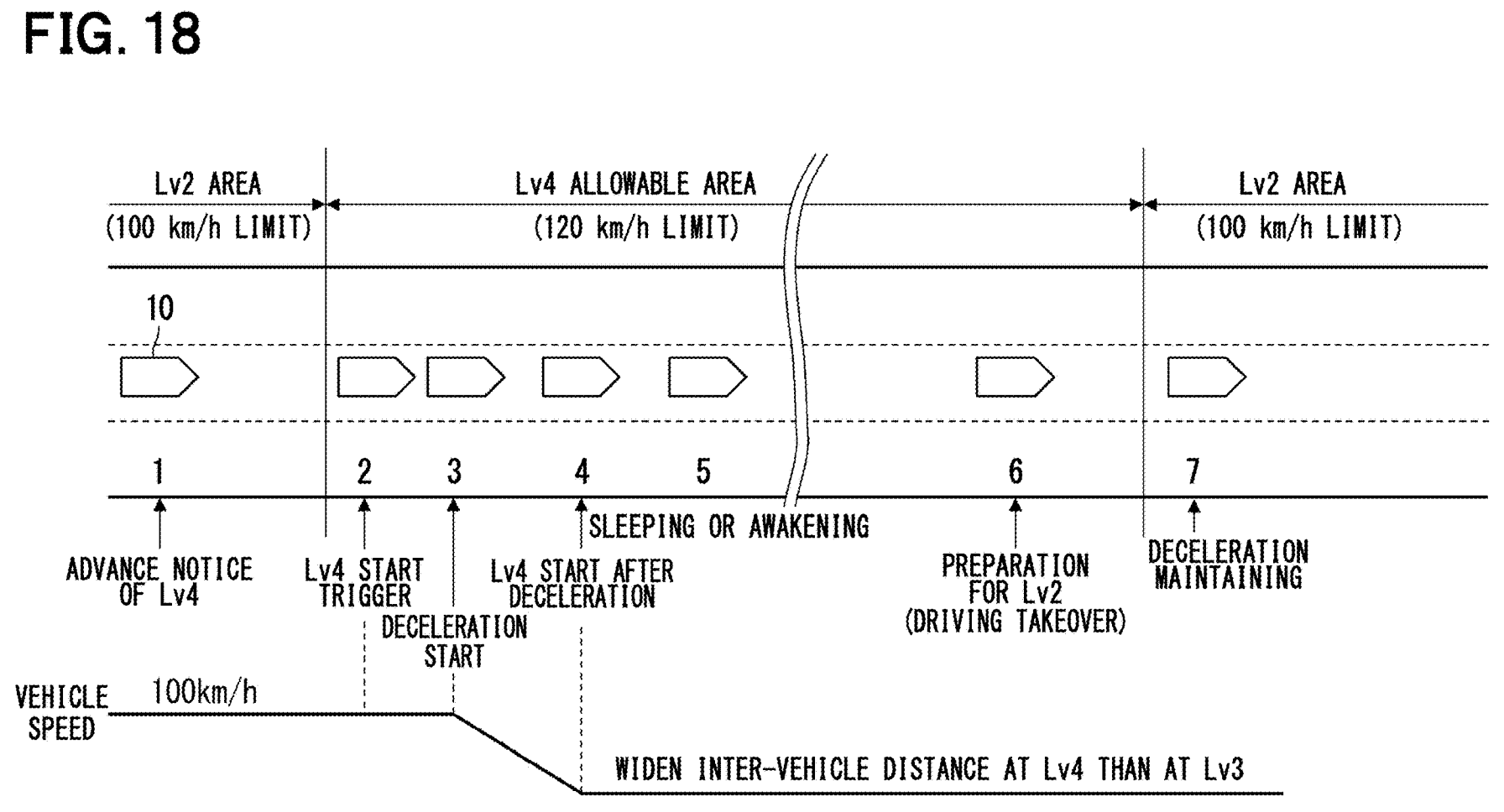

A tenth embodiment is shown in FIG. 18. In the tenth embodiment, as shown in FIG. 18, the control unit 70 sets an inter-vehicle distance between the subject vehicle and another vehicle to be different between the automatic driving level 4 (second automatic driving state) and the automatic driving level 3 (third automatic driving state) even when the set vehicle speed is the same between the automatic driving level 4 and the automatic driving level 3. The inter-vehicle distance includes both the inter-vehicle distance between a preceding vehicle and the subject vehicle, and the inter-vehicle distance between a following vehicle and the subject vehicle.

Specifically, the control unit 70 sets the inter-vehicle distance at the automatic driving level 4 to be wider than the inter-vehicle distance at the automatic driving level 3. The control unit 70 temporarily reduces speed to increase the distance to the preceding vehicle, and temporarily increases the speed to increase the distance to the following vehicle.

As a result, it is possible to change the inter-vehicle distance flexibly at the automatic driving level 4 compared to at the automatic driving level 3, allowing smooth traveling.

Eleventh Embodiment

Figure 19:
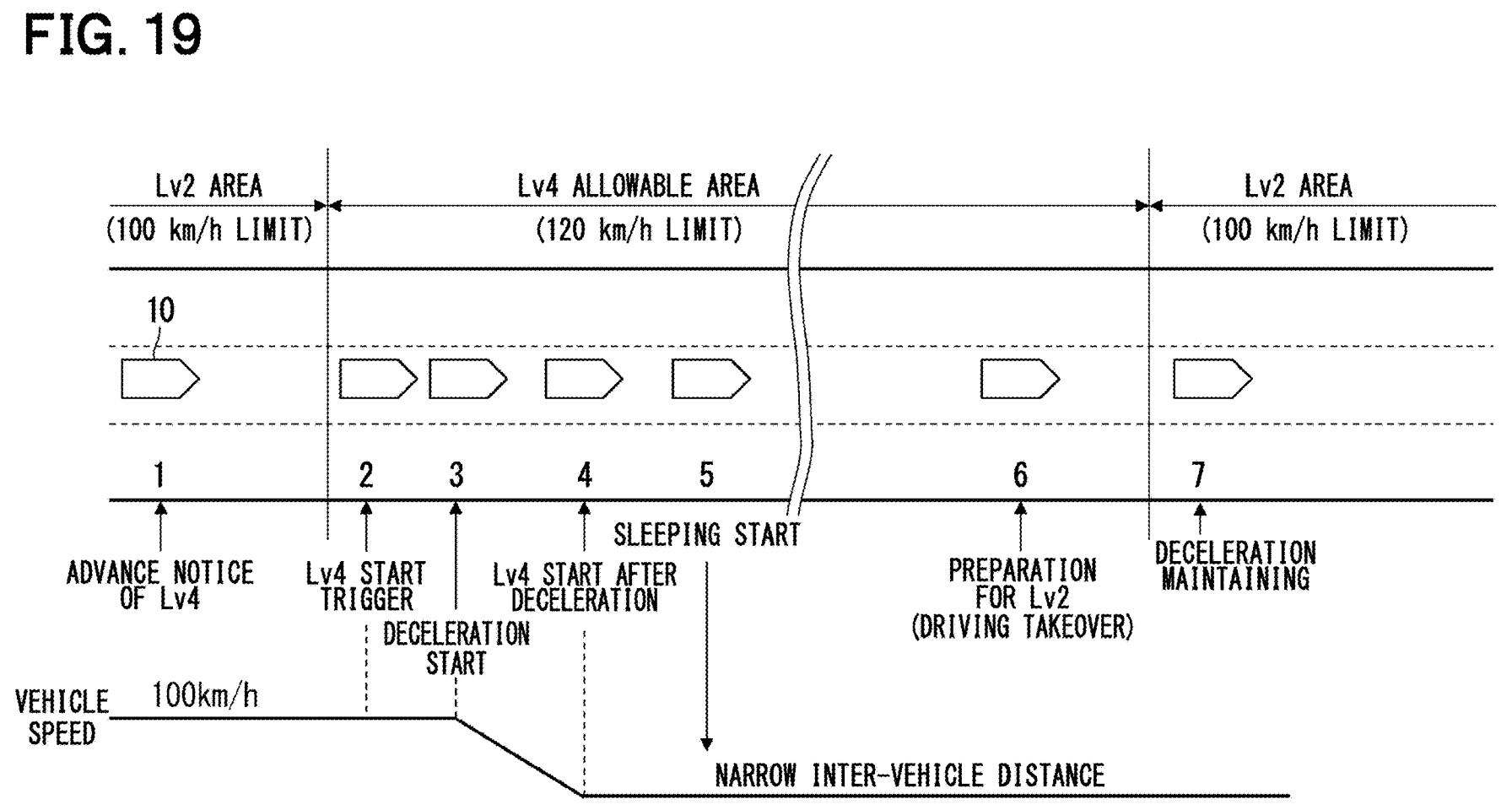

An eleventh embodiment is shown in FIG. 19. In the eleventh embodiment, as shown in FIG. 19, the control unit 70 sets the inter-vehicle distance at the automatic driving level 4 (second automatic driving state) to be different depending on whether the occupant is awake or asleep based on detection results of the in-vehicle camera 45 (detection unit).

Specifically, the control unit 70 sets the inter-vehicle distance to be narrower when the occupant is asleep than when the occupant is awake.

As a result, the inter-vehicle distance is narrowed, and thus air resistance can be reduced by the preceding vehicle during traveling, making it possible to improve fuel efficiency. At this time, the occupant is asleep and thus not concerned (not aware) of the reduced inter-vehicle distance.

Twelfth Embodiment

Figure 20:
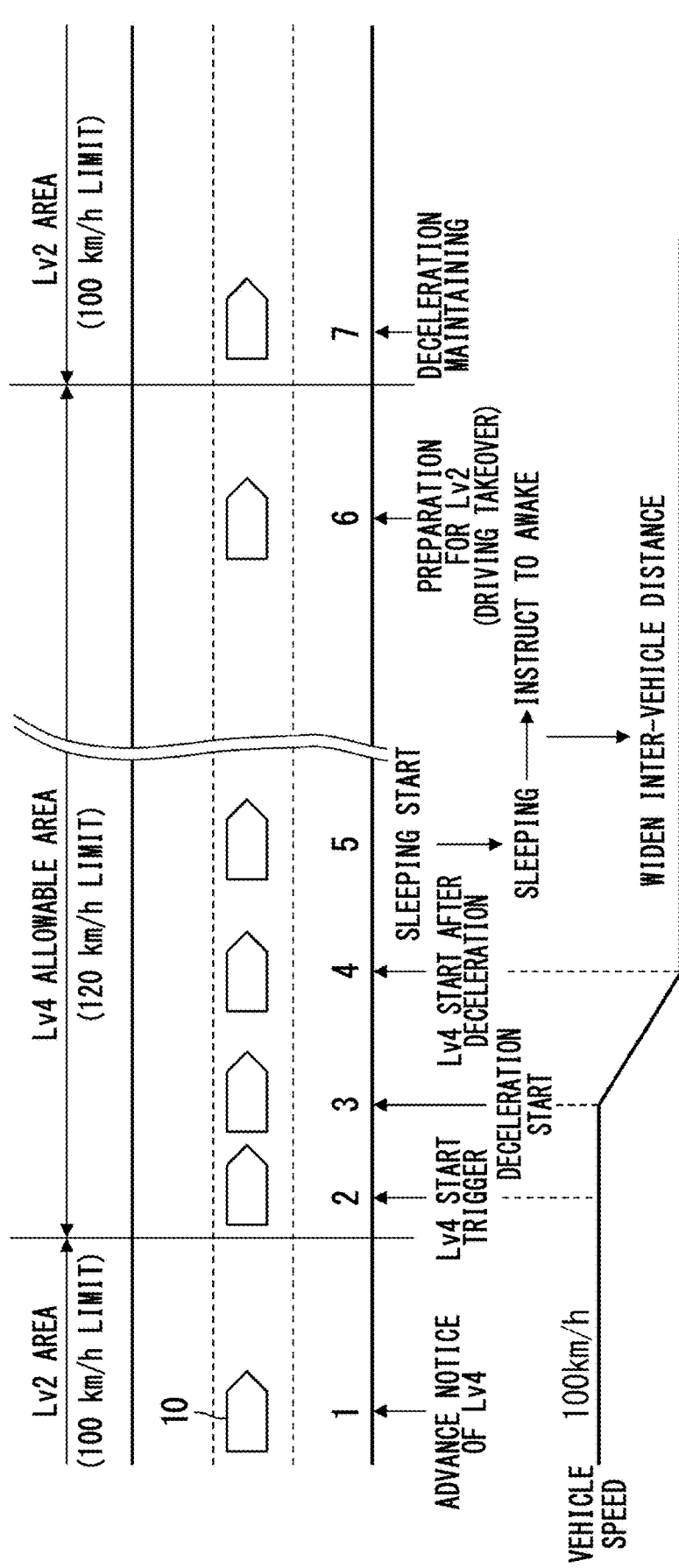
FIG. 20 is a schematic illustration of the contents of automatic drive control in the twelfth embodiment.

A twentieth embodiment is shown in FIG. 20. In the twelfth embodiment, as shown in FIG. 20, the control unit 70 sets the inter-vehicle distance to be wider at a stage before urging an occupant into the awake state in the case of urging the occupant in the asleep state into the awake state.

Examples of the case of urging the occupant in the asleep state into the awake state include a case where the vehicle approaches a destination while the locator 30 performs destination guidance, a case where an emergency occurs, and a case where driving takeover is required in switching to the automatic driving level 2 or lower. In this case, according to an instruction from the control unit 70, the HCU 160 urges the occupant to be awake, for example, by audio from the audio device 140.

At the stage before urging the occupant to be awake as described above, the control unit 70 sets the inter-vehicle distance to be wider than before.

As a result, when the occupant becomes awake, the inter-vehicle distance has been widened, thus preventing the occupant from feeling anxiety.

Thirteenth Embodiment

Figure 21:
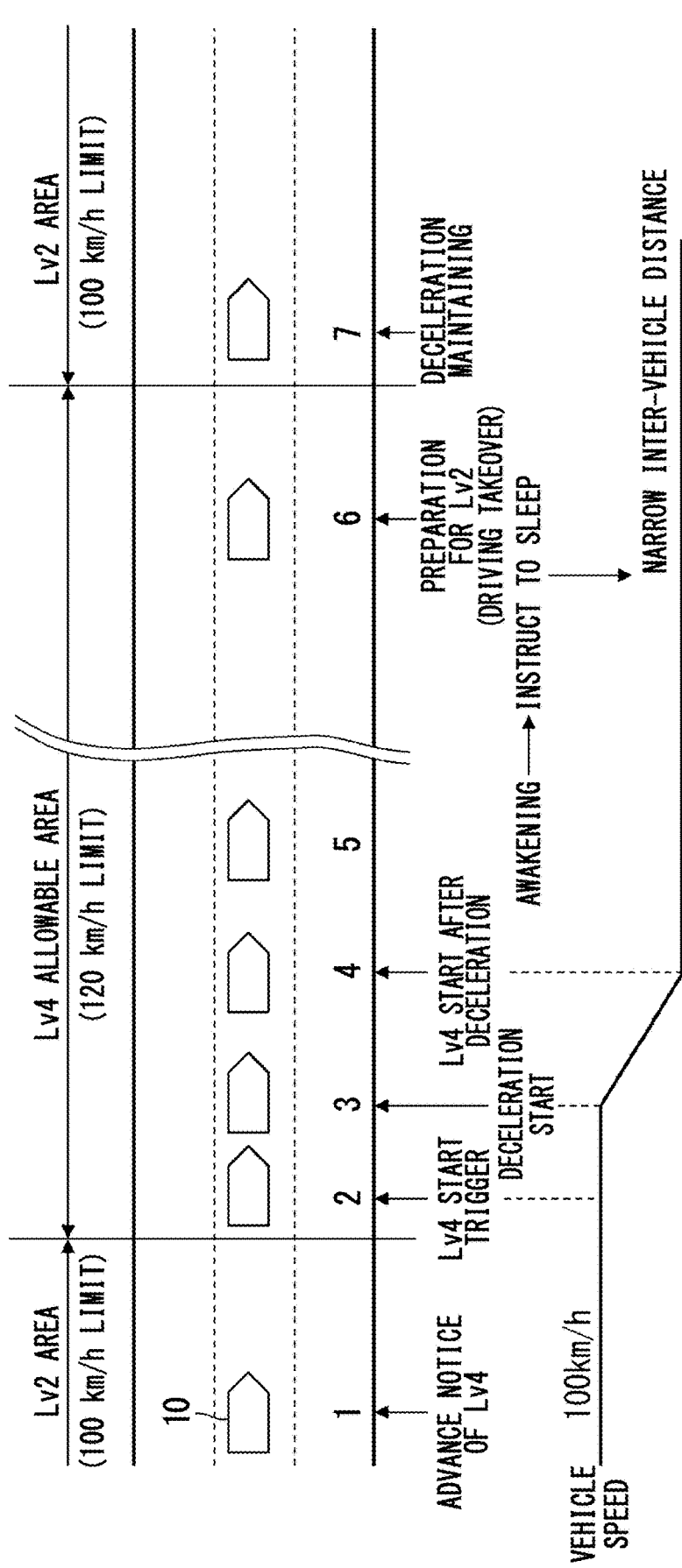
FIG. 21 is a schematic illustration of the contents of automatic drive control in the thirteenth embodiment.

A thirteenth embodiment is shown in FIG. 21. In the thirteenth embodiment, as shown in FIG. 21, the control unit 70 sets the inter-vehicle distance to be narrower at a stage after urging an occupant into the asleep state in the case of urging the occupant in the awake state into the asleep state. The control unit 70 sets the inter-vehicle distance to be narrower after confirming the occupant to be asleep by the in-vehicle camera 45.

As a result, the inter-vehicle distance is narrowed, and thus air resistance can be reduced by the preceding vehicle during traveling, making it possible to improve fuel efficiency. At this time, the occupant is asleep and thus not concerned (not aware) of the reduced inter-vehicle distance.

Fourteenth Embodiment

Figure 22:
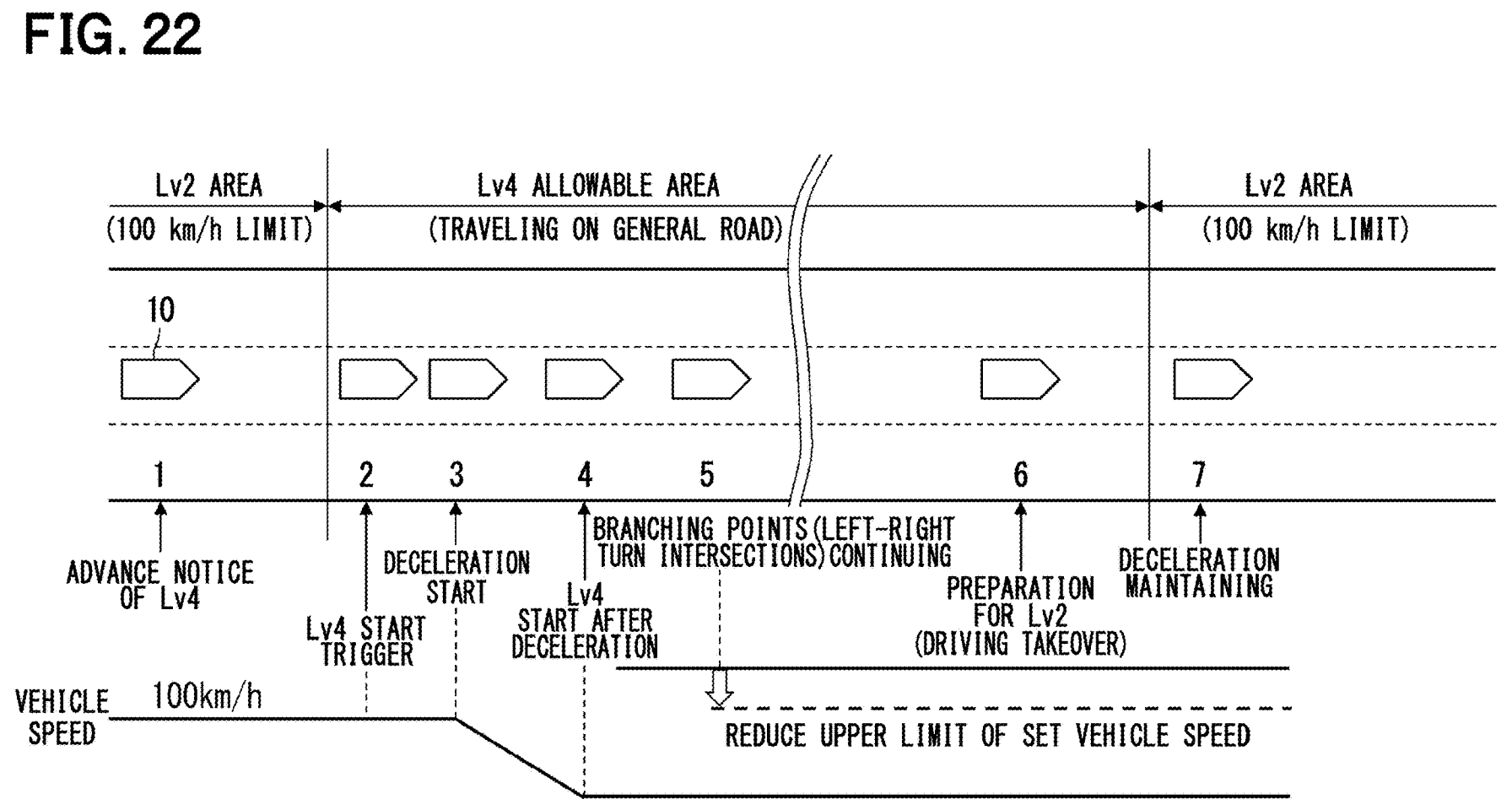

A fourteenth embodiment is shown in FIG. 22. In the fourteenth embodiment, as shown in FIG. 22, when a vehicle travels on a general road at the automatic driving level 4 (second automatic driving state), and when a plurality of branching points are continued on a route guided by the locator 30 (car navigation device), the control unit 70 limits the upper limit of the set vehicle speed at the automatic driving level 4 to a predetermined vehicle speed being on a lower side.

Specifically, the branching points being continued are, for example, left-right turn intersections, and when at least some of the right-left turn intersections are continued, the control unit 70 limits the set vehicle speed after turning at a first intersection to a predetermined vehicle speed.

For example, when two intersections that each require a change in traveling direction continue (are close to each other) on a guide route, the locator 30 outputs information of such intersections collectively as one piece of information. In this embodiment, this information is used as a trigger to limit the set vehicle speed after turning the first intersection to the predetermined vehicle speed.

As a result, it is possible to achieve gentle acceleration after turning the first intersection, and thus riding comfort of the occupants is not disturbed at the subsequent intersections.

Fifteenth Embodiment

Figure 23:
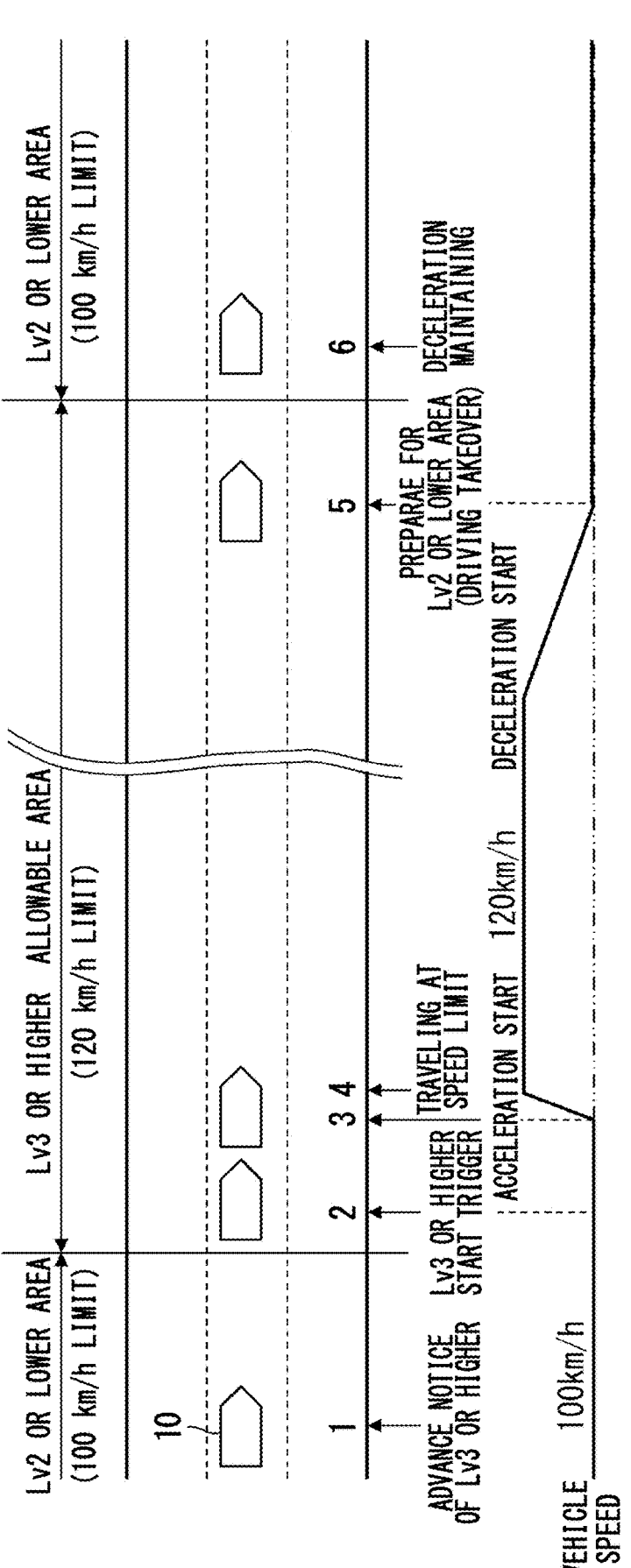
FIG. 23 is a schematic illustration of the contents of automatic drive control in the fifteenth embodiment.

A fifteenth embodiment is shown in FIG. 23. In the fifteenth embodiment, as shown in FIG. 23, the control unit 70 increases vehicle speed to reach the second maximum speed set for a road for traveling at the automatic driving level 3 or higher after shift from the automatic driving level 2 or lower (low automatic driving state) to the automatic driving level 3 or higher (high automatic driving state, automatic driving levels 3 and 4). Furthermore, the control unit 70 reduces the vehicle speed to be equal to or lower than the first maximum speed set for a road for traveling at the automatic driving level 2 or lower at the stage before shifting from the automatic driving level 3 or higher to the automatic driving level 2 or lower.

In this case, the speed limit (first maximum speed) on the road (area) corresponding to the automatic driving level 2 or lower is, for example, 100 km/h, and the speed limit (second maximum speed) on the road (allowable area) corresponding to the automatic driving level 3 or higher is, for example, 120 km/h. At the automatic driving level 2 or lower, the vehicle 10 travels at, for example, 100 km/h.

When an allowable area of the automatic driving level 3 or higher approaches, the control unit 70 gives an advance notice regarding shift to the automatic driving level 3 or higher. Furthermore, the control unit 70 enters the allowable area of the automatic driving level 3 or higher and confirms permission input (start trigger of level 3 or higher) from the driver regarding start of the automatic driving level 3 or higher using the operating device 60. The control unit 70 then starts acceleration so that vehicle speed increases from 100 km/h to 120 km/h, and when the vehicle speed reaches 120 km/h, it maintains the speed of 120 km/h.

Furthermore, when the area of the automatic driving level 2 or lower approaches, the control unit 70 reduces the vehicle speed from 120 km/h to 100 km/h or less (deceleration) at the stage before shift to the automatic driving level 2 or lower. The control unit 70 then gives a notification for driving takeover at the automatic driving level 2 or lower for driving takeover of the driver. The vehicle 10 travels in the area of the automatic driving level 2 or lower at the reduced speed (100 km/h).

For example, when a vehicle is traveling at a constant speed of 100 km/h at the automatic driving level 2 or lower, the vehicle probably continues to travel at a vehicle speed of 100 km/h at the automatic driving level 3 or higher. In this embodiment, however, since the vehicle speed can be increased to match the speed limit of the road corresponding to the automatic driving level 3 or higher, the vehicle can travel at a faster speed.

In shift from the automatic driving level 3 or higher to the automatic driving level 2 or lower again, the vehicle speed is reduced in advance to the speed limit of the road corresponding to the automatic driving level 2 or lower, allowing smooth shift.

Sixteenth Embodiment

A sixteenth embodiment is shown in FIG. 24. As shown in FIG. 24, the sixteenth embodiment is the same as the fifteenth embodiment, except that after shift from the automatic driving level 2 or lower (low automatic driving state) to the automatic driving level 3 or higher (high automatic driving state, automatic driving levels 3 and 4), the control unit 70 temporarily continues traveling at a vehicle speed of the automatic driving level 2 or lower. When the continued vehicle speed is lower than the maximum speed set for the road for traveling at the automatic driving level 3 or higher, the control unit 70 notifies the driver of the maximum speed by the notification unit 105, and when the driver gives permission to accelerate, increases the vehicle speed to reach the maximum speed.

In this case, as in the fifteenth embodiment, the speed limit on a road (area) corresponding to the automatic driving level 2 or lower is, for example, 100 km/h, and the speed limit (maximum speed) on a road (allowable area) corresponding to the automatic driving level 3 or higher is, for example, 120 km/h.

As in the fifteenth embodiment, the control unit 70 reduces the vehicle speed to be equal to or lower than the speed limit set for the road for traveling at the automatic driving level 2 or lower at the stage before shift from the automatic driving level 3 or higher to the automatic driving level 2 or lower.

In this embodiment, the driver is notified of the maximum speed (120 km/h) in the allowable area of the automatic driving level 3 or higher, and when the driver gives permission to accelerate, the vehicle speed is increased, and thus speed change (acceleration) is performed after the driver has recognized the speed change, allowing traveling at a faster speed while the driver feels no anxiety.

Seventeenth Embodiment

Figure 25:
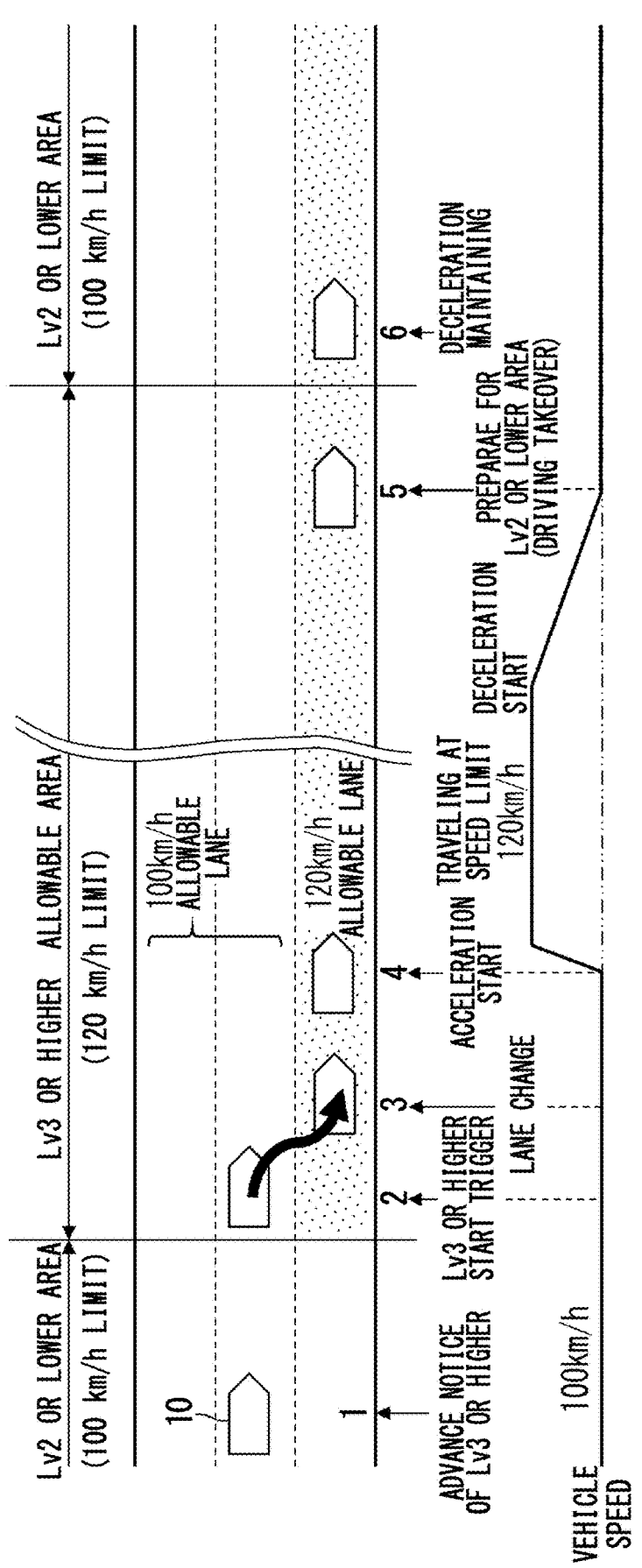
FIG. 25 is a schematic illustration of the contents of automatic drive control in the seventeenth embodiment.

A seventeenth embodiment is shown in FIG. 25. In the seventeenth embodiment, as shown in FIG. 25, when there is an overspeed-allowable lane allowing overspeed in the case of the automatic driving level 2 or lower (low automatic driving state) in the allowable area (high automatic area) that allows the automatic driving level 3 or higher (high automatic driving state), the control unit 70 attempts lane change to the overspeed-allowable lane.

In this case, the speed limit on the road (area) corresponding to the automatic driving level 2 or lower is, for example, 100 km/h. In the road (allowable area) corresponding to the automatic driving level 3 or higher, the two left lanes are traveling lanes while the right lane is a passing lane with respect to the traveling direction of the vehicle 10. The speed limit is, for example, 100 km/h for the traveling lane, and, for example, 120 km/h for the passing lane. At the automatic driving level 2 or lower, the vehicle 10 travels at, for example, 100 km/h.

When a vehicle enters a traveling lane with a speed limit of 100 km/h in an allowable area of the automatic driving level 3 or higher from the area of the automatic driving level 2 or lower, the control unit 70 performs lane change to the passing lane with the speed limit of 120 km/h. Depending on traveling statuses of other vehicles in the passing lane, vehicle 10 may not be able to perform lane change.

When the lane change is allowable, the control unit 70 starts acceleration to increase vehicle speed from 100 km/h to 120 km/h, and when the vehicle speed reaches 120 km/h, maintains that vehicle speed.

As in the fifteenth embodiment, when the area of the automatic driving level 2 or lower approaches, the control unit 70 reduces the vehicle speed from 120 km/h to 100 km/h or less (deceleration) at the stage before shift to the automatic driving level 2 or lower. The control unit 70 then gives a notification for driving takeover at the automatic driving level 2 or lower for driving takeover of the driver. The vehicle 10 travels in the area of the automatic driving level 2 or lower at the reduced speed (100 km/h).

In this embodiment, in the allowable area allowing the automatic driving levels 3 or higher, when there is a passing lane (overspeed-allowable lane) allowing overspeed in the case of the automatic driving level 2 or lower, lane change to the passing lane is attempted. As a result, when lane change is allowable, the vehicle speed can be increased, allowing traveling at a faster speed.

Modification of Seventeenth Embodiment

Figure 26:
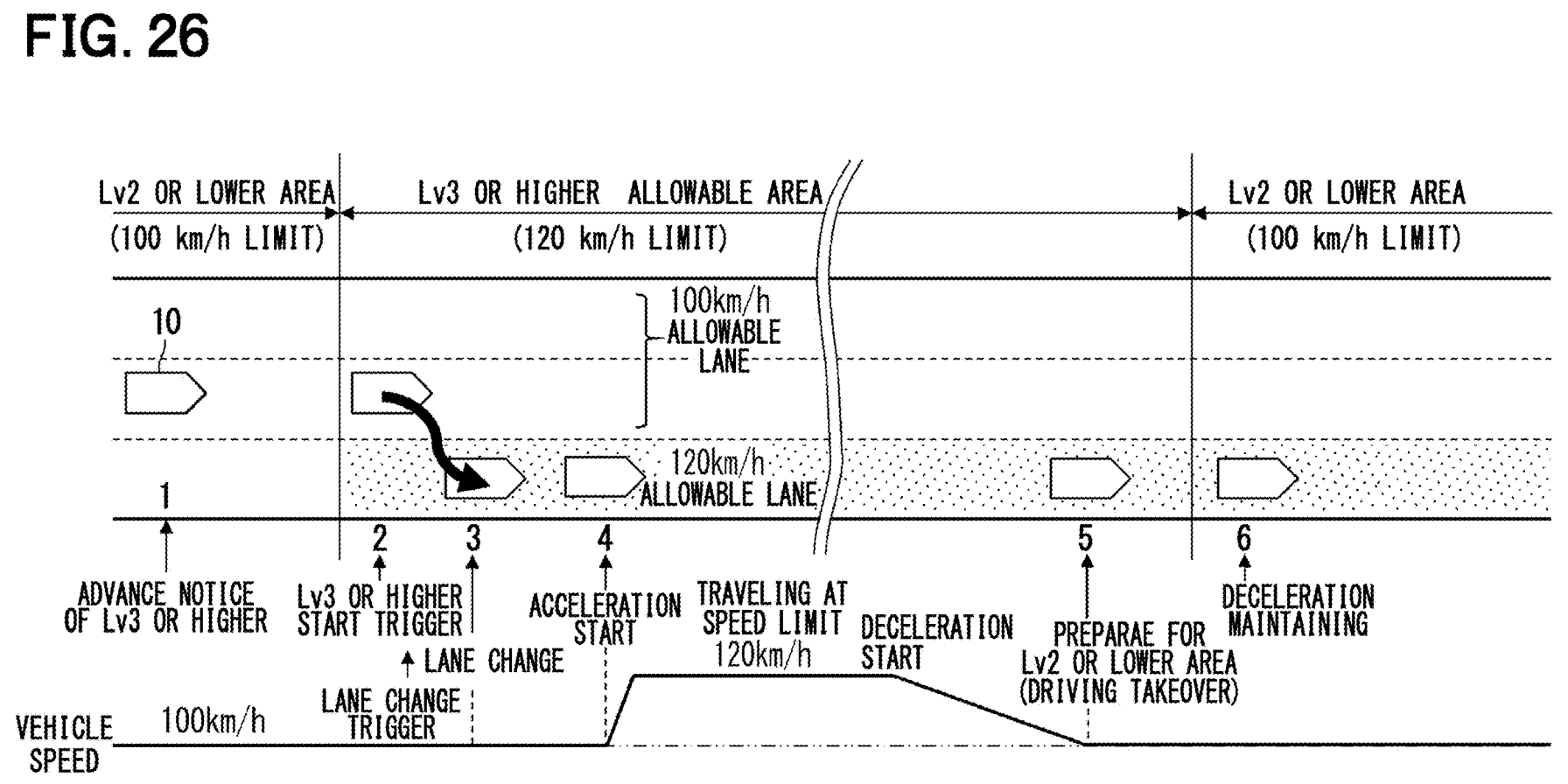

A modification of the seventeenth embodiment is shown in FIG. 26. In the modification of the seventeenth embodiment, as shown in FIG. 26, the seventeenth embodiment is modified as follows: when entering into the passing lane is allowable, the control unit 70 notifies the driver of the lane change by the notification unit 105, and when the driver gives permission for lane change (trigger), it performs lane change. The control unit 70 determines traveling statuses of other vehicles in the passing lane, i.e., determines whether there is an empty space for lane change in the passing lane, and when there is a space, notifies the driver of that space, and performs lane change after getting permission for lane change.

As a result, lane change to the passing lane can be reliably performed, allowing traveling at a faster speed.

Eighteenth Embodiment

Figure 27:
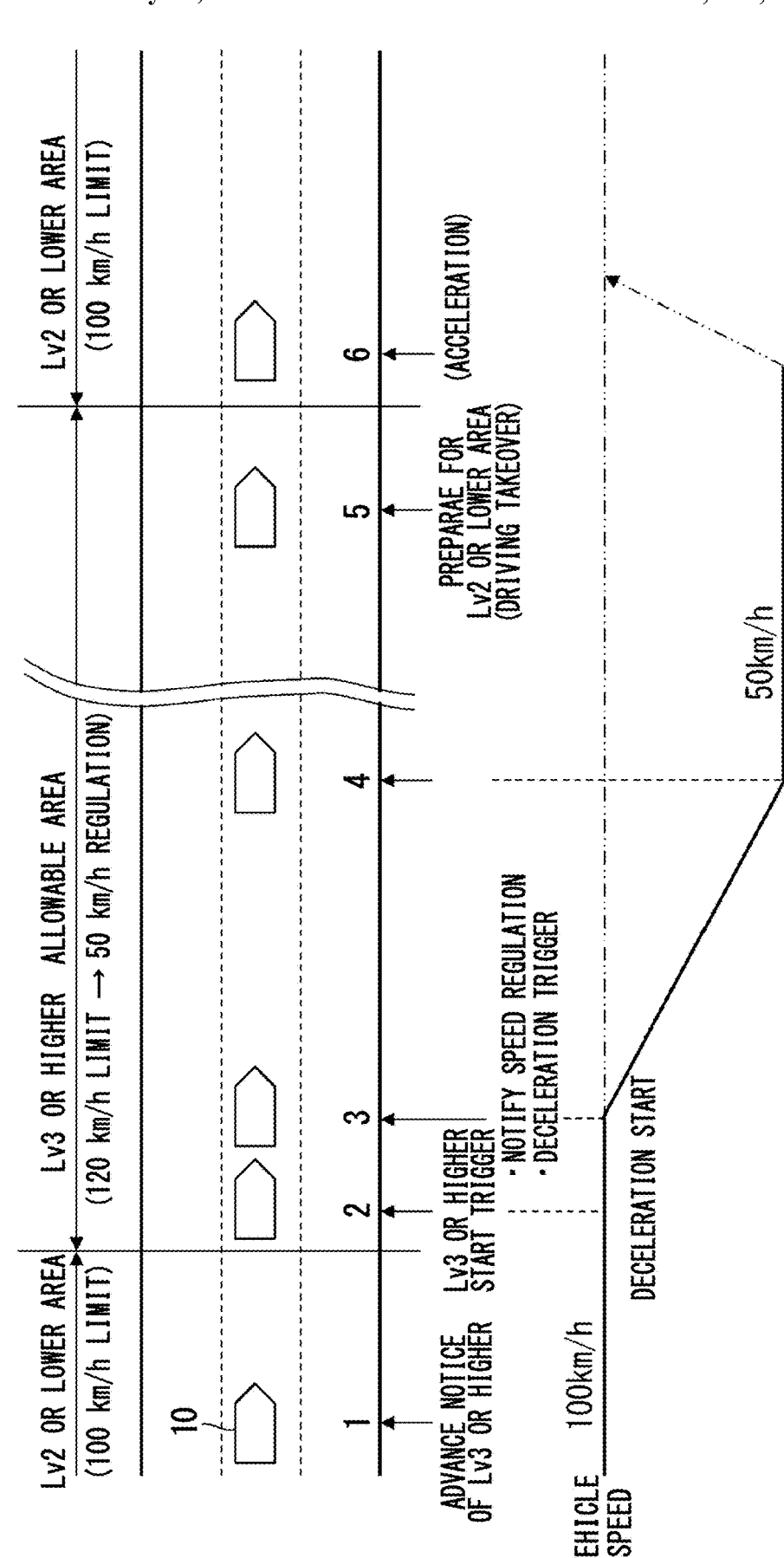
FIG. 27 is a schematic illustration of the contents of automatic drive control in the eighteenth embodiment.

An eighteenth embodiment is shown in FIG. 27. In the eighteenth embodiment, as shown in FIG. 27, in the allowable area (high automatic area) that allows the automatic driving level 3 or higher (high automatic driving state), when speed regulation is executed due to traveling environment, the control unit 70 notifies the driver of the regulated speed by the notification unit 105, and when the driver gives permission to decelerate, it performs deceleration to the regulated speed.

The speed regulation regulates the original speed limit to a lower speed side due to the traveling environment, including, for example, weather (rain, wind, fog, snow, frozen roads, etc.), earthquakes, construction work, traffic accidents, and the like. FIG. 27 shows an example where the original speed limit of 120 km/h is regulated to a regulated speed of 50 km/h in the allowable area of the automatic driving level 3 or higher.

At this time, the control unit 70 sets the speed change rate during deceleration, which is performed at reducing the speed limit to the regulated speed of 50 km/h, to be smaller (sets the gradient of change to be gentler) than the speed change rate during acceleration when acceleration is assumed, for example, as in the above fifteenth to seventeenth embodiments.

When the area of the automatic driving level 2 or lower approaches, the control unit 70 gives a notification for driving takeover at the automatic driving level 2 or lower for driving takeover of the driver. After shift to the automatic driving level 2 or lower, the control unit 70 increases vehicle speed to the speed limit in the area of the automatic driving level 2 or lower.

When vehicle speed is reduced to the regulated speed without notification of the speed limit as above and driver's permission to decelerate, for example, speed difference with a following vehicle performing no automatic driving (following vehicle that is not aware of the 50 km/h restriction) increases (rapid approach), resulting in an increase in risk.

However, in this embodiment, when there is a speed restriction due to weather or the like, the restricted speed is notified to the driver by the notification unit 105, and when the driver gives permission to decelerate, speed is reduced to reach the regulated speed, making it possible to suppress occurrence of rapid approach to the following vehicle due to deceleration.

Furthermore, the rate of change in speed during deceleration is set to be smaller than the rate of change in speed during acceleration when acceleration is assumed, making it possible to further suppress rapid approach with the following vehicle. It is further possible to alleviate acceleration occurring in the driver during deceleration.

Modification of Eighteenth Embodiment

Figure 28:
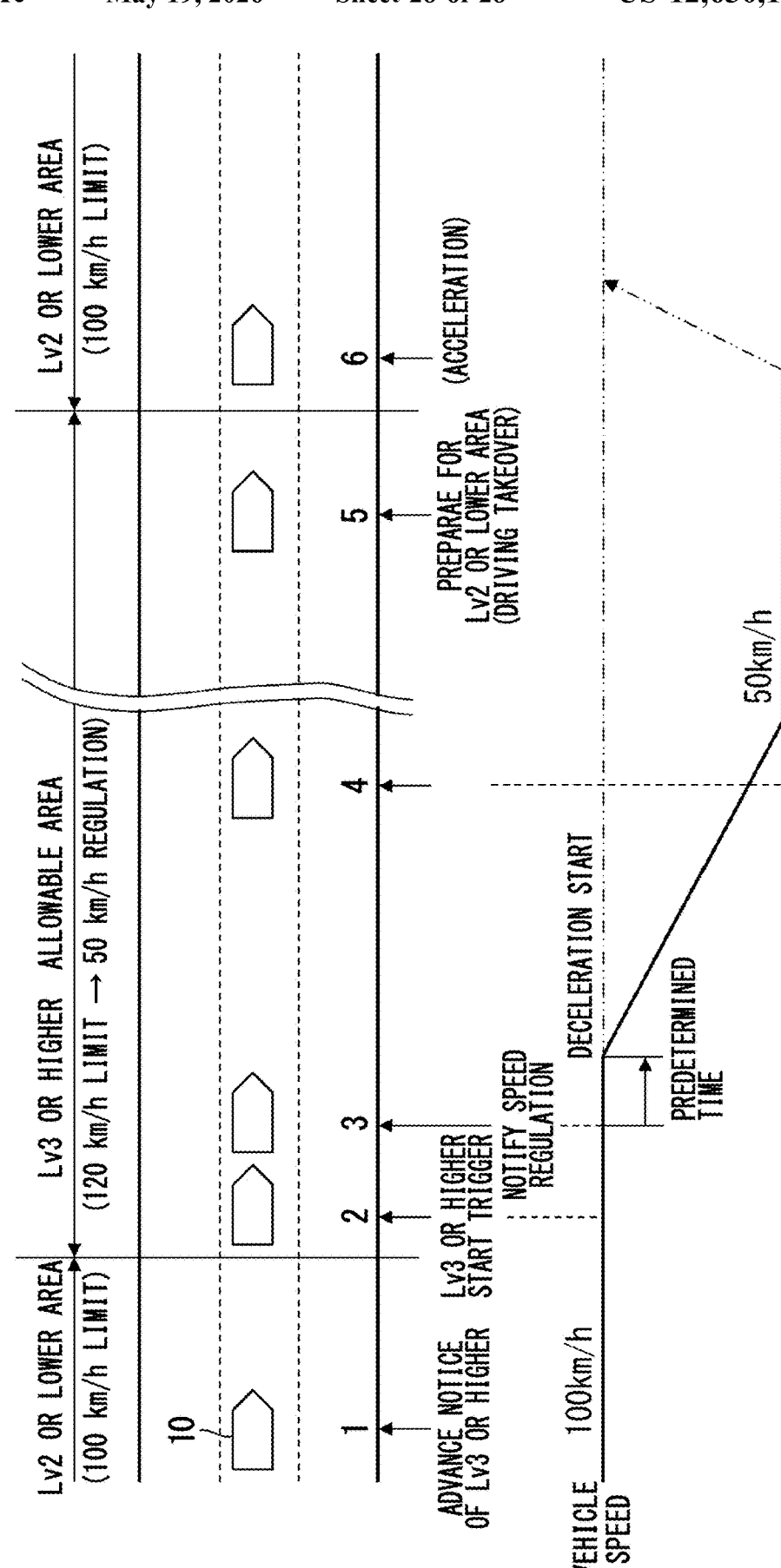
FIG. 28 is a schematic illustration of the contents of automatic drive control in a modification of the eighteenth embodiment.

A modification of the eighteenth embodiment is shown in FIG. 28. In the modification of the eighteenth embodiment, as shown in FIG. 28, the eighteenth embodiment is modified as follows: after notifying the driver of the regulated speed by the notification unit 105, when permission to decelerate is not given even after a predetermined period of time has elapsed, the control unit 70 forcibly executes deceleration to the regulated speed without permission to decelerate.

As a result, even when the driver overlooks the regulated speed and gives no permission to decelerate, since the change to the regulated speed is forcibly executed, safe drive is enabled while the regulated speed is observed.

OTHER EMBODIMENTS

Although the notification unit 105 includes the meter display 120 and the audio device 140 in each of the above embodiments, the notification unit 105 is not limited thereto but may include the HUD 110 or CID 130. When the CID 130 is used as the notification unit 105, a display on automatic driving and operation (touch operation) for switching to the automatic driving can be achieved by the CID 130.

Alternatively, the CID 130 may be formed of, for example, a plurality of CIDs so that the notification unit 105 is of a pillar-to-pillar type, in which the meter display 120 and the CIDs are arranged in a horizontal line on the instrument panel.

The disclosure in this description, the drawings, and the like is not limited to the illustrated embodiments. The disclosure encompasses the illustrated embodiments and variations made by those skilled in the art based on the embodiments. For example, the disclosure is not limited to the combinations of the components and/or elements described in the embodiments. The disclosure can be implemented with various combinations. The disclosure can include an additional portion that can be added to any of the embodiments. The disclosure encompasses any of the embodiments, from which a component and/or an element is/are omitted. The disclosure encompasses substitution or a combination of components and/or elements between one embodiment and another embodiment. The disclosed technical scope is not limited to the description of the embodiments. The several technical scopes disclosed are indicated by the statements of claims and should be further understood to include all modifications within the meaning and scopes equivalent to the statements of the claims.

The control unit 70, the HCU 160, and the methods thereof described in the disclosure may be achieved by a dedicated computer provided by configuring a processor, which is programmed to execute one or more functions embodied by a computer program, and a memory.

Alternatively, the control unit 70, HCU 160, and the methods thereof described in the disclosure may be achieved by a dedicated computer provided by configuring a processor by one or more special hardware logics.

Alternatively, the control unit 70, the HCU 160, and the methods thereof described in the disclosure may be achieved by one or more dedicated computer configured by a combination of a processor, which is programmed to execute one or more functions, a memory, and a processor including one or more hardware logics.

The computer program may be stored, in a form of an instruction to be executed by a computer, in a computer-readable, non-transitory tangible storage medium.

The flowcharts shown in the embodiments or the processes of the flowcharts each include a plurality of sections (or referred to as steps), and each section is expressed as, for example, S100. Furthermore, each section can be divided into multiple subsections, while multiple sections can also be combined into one section. Each section configured in this manner can be referred to as a device, module, or means.

What is claimed is:

1. A vehicle control device comprising:
   a control unit configured to perform switching control, in automatic driving of a vehicle, between a first automatic driving state of an automatic driving level 2 or lower with manual driving or surrounding monitoring obligation, and a second automatic driving state of an automatic driving level 4 or higher with no surrounding monitoring obligation and allowing sleep, depending on a road on which the vehicle travels; and
   a detection unit configured to detect a status of at least one occupant of the vehicle, wherein
   when the control unit determines that a driver among the at least one occupant is in an asleep state based on a detection result of the detection unit in the second automatic driving state, the control unit is configured to perform acceleration control to adjust second vehicle speed in the second automatic driving state,
      to be higher than first vehicle speed in the first automatic driving state,
      to be equal to the first vehicle speed, or
      to be lower than the first vehicle speed and higher than the second vehicle speed in a current state, and
   when the control unit determines from the detection result of the detection unit that at least one occupant is in an awake state after executing the acceleration control, the control unit is configured to execute second deceleration control to reduce the vehicle speed after the acceleration control to a predetermined vehicle speed.

2. The vehicle control device according to claim 1, wherein
   when the driver is in the asleep state and when the vehicle travels at a lower vehicle speed than the first vehicle speed in the second automatic driving state, the control unit is configured to execute the acceleration control.

3. The vehicle control device according to claim 1, wherein after executing the acceleration control, at shift to the first automatic driving state, the control unit is configured to execute first deceleration control to change the vehicle speed to a speed lower than the first vehicle speed before starting the second automatic driving state.

4. The vehicle control device according to claim 1, wherein when the control unit determines that there is at least one passenger among the at least one occupant, and when the control unit determines that the passenger is in an awake state based on the detection result of the detection unit, the control unit is configured to prohibit execution of the acceleration control.

5. A vehicle control device comprising:

a control unit configured to perform switching control, in automatic driving of a vehicle, between a first automatic driving state of an automatic driving level 2 or lower with manual driving or surrounding monitoring obligation, and a second automatic driving state of an automatic driving level 4 or higher with no surrounding monitoring obligation and allowing sleep, depending on a road on which the vehicle travels;

a detection unit configured to detect a status of at least one occupant of the vehicle; and a notification unit configured to notify information on the automatic driving, wherein when the control unit determines that a driver among the at least one occupant is in an asleep state based on a detection result of the detection unit in the second automatic driving state, the control unit is configured to perform acceleration control to adjust second vehicle speed in the second automatic driving state, to be higher than first vehicle speed in the first automatic driving state, to be equal to the first vehicle speed, or to be lower than the first vehicle speed and higher than the second vehicle speed in a current state, and after executing the acceleration control, when the control unit determines from detection results of the detection unit that the driver and at least one passenger among the at least one occupant are in an awake state, the control unit is configured to cause the notification unit to give a notification to the driver to allow the driver to select whether to perform second deceleration control to reduce the vehicle speed after the acceleration control to a predetermined vehicle speed.

6. A vehicle control device comprising:

a control unit configured to perform switching control, in automatic driving of a vehicle, between a first automatic driving state of an automatic driving level 2 or lower with manual driving or surrounding monitoring obligation, and a second automatic driving state of an automatic driving level 4 or higher with no surrounding monitoring obligation and allowing sleep, depending on a road on which the vehicle travels;

a detection unit configured to detect a status of at least one occupant of the vehicle; and an autonomous sensor configured to detect surrounding environment of the vehicle, wherein when the control unit determines that the occupant is in an awake state based on a detection result of the detection unit in the second automatic driving state, the control unit is configured to change vehicle speed in the second automatic driving state depending on the surrounding environment acquired by the autonomous sensor or an execution status of a second task of the occupant acquired by the detection unit, the second task being allowed in the second automatic driving state.

7. The vehicle control device according to claim 6, wherein when the control unit changes the vehicle speed, the control unit is configured to decelerate when the surrounding environment is in a scenic spot, and accelerate when the surrounding environment is in a place other than the scenic spot.

8. The vehicle control device according to claim 6, wherein when the control unit changes the vehicle speed, the control unit is configured to reduce the vehicle speed after the occupant completes the second task.

9. A vehicle control device comprising:

a control unit configured to perform switching control, in automatic driving of a vehicle, between a first automatic driving state of an automatic driving level 2 or lower with manual driving or surrounding monitoring obligation, a second automatic driving state of an automatic driving level 4 or higher with no surrounding monitoring obligation and allowing sleep, and a third automatic driving state of an automatic driving level 3 with no surrounding monitoring obligation, depending on a road on which the vehicle travels, wherein the control unit is configured to adjust an acceleration/deceleration range of set vehicle speed in the second automatic driving state to be wider than the acceleration/deceleration range of the set vehicle speed in the third automatic driving state.

10. The vehicle control device according to claim 9, further comprising:

a detection unit configured to detect a status of an occupant of the vehicle, wherein the control unit is configured to adjust the acceleration/deceleration range in the second automatic driving state depending on whether the occupant is in an awake state or an asleep state based on the detection result of the detection unit.

11. The vehicle control device according to claim 9, further comprising:

a detection unit configured to detect a status of an occupant of the vehicle, wherein the control unit is configured to adjust the acceleration/deceleration range in the second automatic driving state according to a status of a second task of the occupant acquired by the detection unit, the second task being allowed in the second automatic driving state.

12. The vehicle control device according to claim 9, further comprising:

a detection unit configured to detect a status of an occupant of the vehicle, wherein in traveling on a curved road in the second automatic driving state, the control unit is configured to adjust the acceleration/deceleration range depending on whether the occupant is in an awake state or an asleep state.

13. A vehicle control device comprising:

a control unit configured to perform switching control, in automatic driving of a vehicle, between a first automatic driving state of an automatic driving level 2 or lower with manual driving or surrounding monitoring obligation, a second automatic driving state of an automatic driving level 4 or higher with no surrounding monitoring obligation and allowing sleep, and a third automatic driving state of an automatic driving level 3 with no surrounding monitoring obligation, depending on a road on which the vehicle travels, wherein the control unit is configured to set an inter-vehicle distance between a subject vehicle and an other vehicle to be different between the second automatic driving state and the third automatic driving state, even when set vehicle speed is the same between the second automatic driving state and the third automatic driving state, and the control unit is configured to set the inter-vehicle distance in the second automatic driving state to be wider than the inter-vehicle distance in the third automatic driving state.

14. The vehicle control device according to claim 13, further comprising:

a detection unit configured to detect a status of an occupant of the vehicle, wherein the control unit is configured to set the inter-vehicle distance in the second automatic driving state to be different depending on whether the occupant is in an awake state or an asleep state, based on a detection result of the detection unit.

15. The vehicle control device according to claim 14, wherein the control unit is configured to set the inter-vehicle distance to be narrower when the occupant is in the asleep state than in the awake state.

16. The vehicle control device according to claim 14, wherein the control unit is configured to urge the occupant in the asleep state into the awake state, and set the inter-vehicle distance to be wider before urging the occupant into the awake state.

17. The vehicle control device according to claim 14, wherein the control unit is configured to urge the occupant in the awake state into the asleep state, and set the inter-vehicle distance to be narrower after urging the occupant into the asleep state.

18. The vehicle control device according to claim 9, wherein in traveling on a general road in the second automatic driving state, when a plurality of branching points continue on a route guided by a car navigation device, the control unit is configured to limit an upper limit of the set vehicle speed in the second automatic driving state to a predetermined lower vehicle speed.

19. The vehicle control device according to claim 18, wherein the branching points are a plurality of left-right turn intersections, and when the plurality of right-left turn intersections continue, the control unit is configured to limit the set vehicle speed to the predetermined lower vehicle speed after turning at a first intersection.

20. A vehicle control device comprising:

a control unit configured to perform switching control, in automatic driving of a vehicle, between a low automatic driving state of an automatic driving level 2 or lower with manual driving or surrounding monitoring obligation, and a high automatic driving state of an automatic driving level 3 or higher with no surrounding monitoring obligation, depending on a road on which the vehicle travels, wherein the control unit is configured to shift from the low automatic driving state to the high automatic driving state, when determining that an area, in which the vehicle is allowed to travel in the high automatic driving state, approaches, and determining that permission input from a driver is confirmed, the control unit is configured to increase vehicle speed to reach a second maximum speed, which is set for a road for traveling at the high automatic driving state, after shift from the low automatic driving state to the high automatic driving state, and the control unit is configured to reduce the vehicle speed to be equal to or lower than a first maximum speed, which is set for a road for traveling at the low automatic driving state, when determining that an area, in which the vehicle is required to travel in the low automatic driving state, approaches, before shift from the high automatic driving state to the low automatic driving state.

21. A vehicle control device comprising:

a control unit configured to perform switching control, in automatic driving of a vehicle, between a low automatic driving state of an automatic driving level 2 or lower with manual driving or surrounding monitoring obligation, and a high automatic driving state of an automatic driving level 3 or higher with no surrounding monitoring obligation, depending on a road on which the vehicle travels; and a notification unit configured to notify information on the automatic driving, wherein after shift from the low automatic driving state to the high automatic driving state in response to determining that an area, in which the vehicle is allowed to travel in the high automatic driving state, approaches, the control unit is configured to continue traveling at a vehicle speed in the low automatic driving state, when the vehicle speed as continued is lower than a maximum speed, which is set for a road for traveling in the high automatic driving state, the control unit is configured to cause the notification unit to notify a driver of the maximum speed, and when the driver gives permission to accelerate, the control unit is configured to increase the vehicle speed to reach the maximum speed.

22. A vehicle control device comprising:

a control unit configured to perform switching control, in automatic driving of a vehicle, between a low automatic driving state of an automatic driving level 2 or lower with manual driving or surrounding monitoring obligation, and a high automatic driving state of an automatic driving level 3 or higher with no surrounding monitoring obligation, depending on a road on which the vehicle travels, wherein in a high automatic area that allows the high automatic driving state, when there is an overspeed-allowable lane, which allows overspeed in a case of the low automatic driving state, the control unit is configured to attempt lane change to the overspeed-allowable lane.

23. The vehicle control device according to claim 22, further comprising:

a notification unit configured to notify information on the automatic driving, wherein when entering the overspeed-allowable lane is possible, the control unit is configured to cause the notification unit to notify a driver of the lane change, and when the driver gives permission for the lane change, the control unit is configured to perform the lane change.

24. A vehicle control device comprising:

a control unit configured to perform switching control, in automatic driving of a vehicle, between a low automatic driving state of an automatic driving level 2 or lower with manual driving or surrounding monitoring obligation, and a high automatic driving state of an automatic driving level 3 or higher with no surrounding monitoring obligation, depending on a road on which the vehicle travels; and a notification unit configured to notify information on the automatic driving, wherein when speed regulation is executed due to traveling environment in a high automatic area, which allows the high automatic driving state, the control unit is configured to cause the notification unit to notify a driver of regulated speed, and when the driver gives permission to decelerate, the control unit is configured to perform deceleration to the regulated speed.

25. The vehicle control device according to the claim 24, wherein the control unit is configured to set a speed change rate during deceleration to the regulated speed to be smaller than a speed change rate during acceleration when acceleration is assumed.

26. The vehicle control device according to the claim 24, wherein after causing the notification unit to notify the driver of the regulated speed, when the permission to decelerate is ungiven after a predetermined period of time has elapsed, the control unit is configured to forcibly execute deceleration to the regulated speed without permission to decelerate.

\*  \*  \*  \*  \*